United States Patent
Grocutt et al.

(10) Patent No.: US 12,067,263 B2
(45) Date of Patent: Aug. 20, 2024

(54) CONTROLLING MEMORY ACCESS IN A DATA PROCESSING SYSTEMS WITH MULTIPLE SUBSYSTEMS

(71) Applicant: ARM LIMITED, Cambridge (GB)

(72) Inventors: Thomas Christopher Grocutt, Cambridge (GB); Andrew Brookfield Swaine, Cambridge (GB); Alexander Donald Charles Chadwick, Cambridge (GB)

(73) Assignee: Arm Limited, Cambridge (GB)

( * ) Notice: Subject to any disclaimer, the term of this patent is extended or adjusted under 35 U.S.C. 154(b) by 36 days.

(21) Appl. No.: 17/907,205

(22) PCT Filed: Feb. 8, 2021

(86) PCT No.: PCT/GB2021/050278
§ 371 (c)(1),
(2) Date: Sep. 23, 2022

(87) PCT Pub. No.: WO2021/198635
PCT Pub. Date: Oct. 7, 2021

(65) Prior Publication Data
US 2023/0109295 A1 Apr. 6, 2023

(30) Foreign Application Priority Data
Mar. 31, 2020 (GB) ...................................... 2004671

(51) Int. Cl.
*G06F 3/06* (2006.01)
*G06F 12/0891* (2016.01)

(52) U.S. Cl.
CPC .......... *G06F 3/0622* (2013.01); *G06F 3/0629* (2013.01); *G06F 3/0673* (2013.01); *G06F 12/0891* (2013.01)

(58) Field of Classification Search
None
See application file for complete search history.

(56) References Cited

U.S. PATENT DOCUMENTS 11,520,705 B1 * 12/2022 Henning ............. G06F 12/0828
2010/0191889 A1 * 7/2010 Serebrin ............... G06F 9/4812
718/1

(Continued)

*Primary Examiner* — Edward J Dudek, Jr.
*Assistant Examiner* — Ralph A Verderamo, III
(74) *Attorney, Agent, or Firm* — NIXON & VANDERHYE P.C.

(57) ABSTRACT

Apparatuses, methods and techniques for controlling memory access in a data processing system are disclosed. The operating data processing system comprises multiple subsystems, each comprising at least one processing element and at least one peripheral device. Memory transaction control circuitry receives memory transaction information of a memory transaction comprising a stream identifier indicative of the issuing peripheral device. A main control register indicates an address of a stream table having multiple entries each comprising an owning subsystem identifier. At least one subsystem control register corresponding to each subsystem of the multiple subsystems stores memory access checking configuration information. On receipt of the memory transaction information an entry of the stream table is selected in dependence on the stream identifier. At least one subsystem control register. corresponding to the subsystem identified by the owning subsystem identifier of the entry is selected.

23 Claims, 13 Drawing Sheets

(56) References Cited

U.S. PATENT DOCUMENTS

Figure 1:
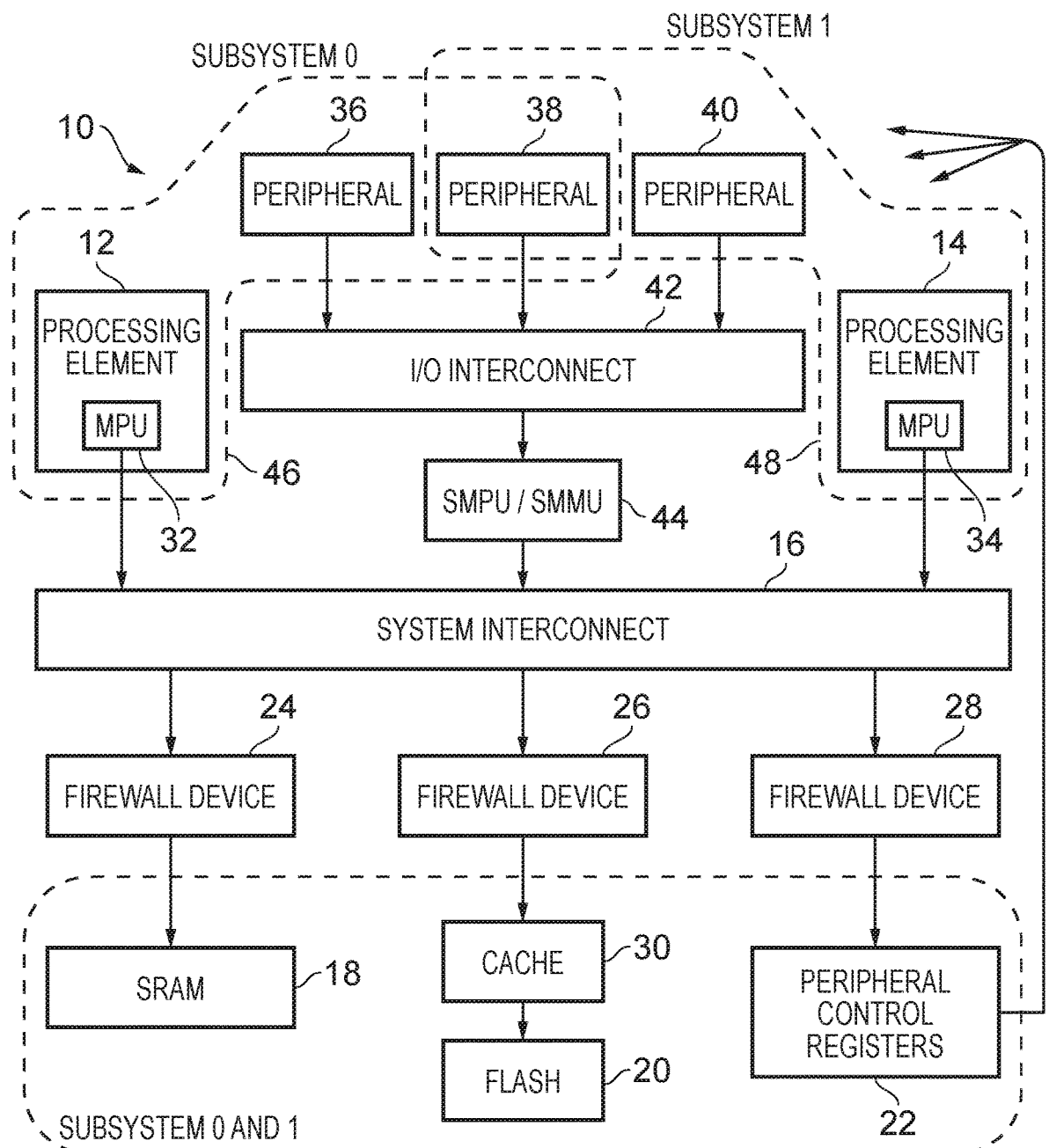

| | | | |
|---|---|---|---|
| 2013/0080726 A1* | 3/2013 | Kegel | G06F 21/85 |
| | | | 711/163 |
| 2017/0286326 A1* | 10/2017 | Guim | G06F 12/1009 |
| 2019/0042463 A1* | 2/2019 | Shanbhogue | G06F 9/30145 |
| 2020/0310665 A1* | 10/2020 | Hansen | G06F 3/0622 |

* cited by examiner

CONTROLLING MEMORY ACCESS IN A
DATA PROCESSING SYSTEMS WITH
MULTIPLE SUBSYSTEMS

This application is the U.S. national phase of International Application No. PCT/GB2021/050278 filed Feb. 8, 2021 which designated the U.S. and claims priority to GB 2004671.0 filed Mar. 31, 2020, the entire contents of each of which are hereby incorporated by reference.

The present techniques relate to data processing. More particularly they relate to the control of memory accesses in data processing systems which comprise multiple subsystems.

In a data processing system which comprises multiple subsystems, these multiple subsystems may be mutually distrustful. Nevertheless these multiple subsystems may need to share access to various components of the data processing system, in particular to memory components and to some control registers, such that control over memory accesses received from devices in the multiple subsystems must be carefully orchestrated in order to protect these subsystems from one another.

At least some examples provide an apparatus for controlling memory access in a data processing system, wherein the data processing system when operating comprises multiple subsystems, each subsystem comprising at least one processing element and at least one peripheral device, the apparatus comprising:

memory transaction control circuitry to receive memory transaction information of a memory transaction issued by a peripheral device of the data processing system, wherein the memory transaction information comprises a stream identifier indicative of the peripheral device;

a main control register to store a value indicative of an address of a stream table, wherein the stream table comprises multiple entries, and wherein the multiple entries each comprise an owning subsystem identifier; and at least one subsystem control register corresponding to each subsystem of the multiple subsystems, the at least one subsystem control register to store memory access checking configuration information, wherein the memory transaction control circuitry is responsive to reception of the memory transaction information:
  to select an entry of the multiple entries of the stream table identified by the value indicative of the address of the stream table in dependence on the stream identifier;
  to select at least one subsystem control register corresponding to the subsystem identified by the owning subsystem identifier of the entry; and
  to cause enforcement of memory access rules in dependence on the memory transaction information and the memory access checking configuration information stored in the selected at least one subsystem control register.

At least some examples provide a method of controlling memory access in a data processing system, wherein the data processing system when operating comprises multiple subsystems, each subsystem comprising at least one processing element and at least one peripheral device, the method comprising:

receiving memory transaction information of a memory transaction issued by a peripheral device of the data processing system, wherein the memory transaction information comprises a stream identifier indicative of the peripheral device;

storing a value indicative of an address of a stream table in a main control register, wherein the stream table comprises multiple entries, and wherein the multiple entries each comprise an owning subsystem identifier;

storing memory access checking configuration information in at least one subsystem control register corresponding to each subsystem of the multiple subsystems; and in response reception of the memory transaction information:
  selecting an entry of the multiple entries of the stream table identified by the value indicative of the address of the stream table in dependence on the stream identifier;
  selecting at least one subsystem control register corresponding to the subsystem identified by the owning subsystem identifier of the entry; and
  causing enforcement of memory access rules in dependence on the memory transaction information and the memory access checking configuration information stored in the selected at least one subsystem control register.

At least some examples provide an apparatus for controlling memory access in a data processing system, wherein the data processing system when operating comprises multiple subsystems, each subsystem comprising at least one processing element and at least one peripheral device, the apparatus comprising:

means for receiving memory transaction information of a memory transaction issued by a peripheral device of the data processing system, wherein the memory transaction information comprises a stream identifier indicative of the peripheral device;

means for storing a value indicative of an address of a stream table in a main control register, wherein the stream table comprises multiple entries, and wherein the multiple entries each comprise an owning subsystem identifier;

means for storing memory access checking configuration information in at least one subsystem control register corresponding to each subsystem of the multiple subsystems;

means for selecting an entry of the multiple entries of the stream table identified by the value indicative of the address of the stream table in dependence on the stream identifier in response to reception of the memory transaction information;

means for selecting at least one subsystem control register corresponding to the subsystem identified by the owning subsystem identifier of the entry; and means for causing enforcement memory access rules in dependence on the incoming memory transaction information and the memory access checking configuration information stored in the selected at least one subsystem control register.

At least some examples provide a computer program for controlling a host data processing apparatus to provide an instruction execution environment comprising:

memory access control logic for controlling memory access in a data processing system, wherein the data processing system when operating comprises multiple subsystems, each subsystem comprising at least one instance of processing element logic and at least one instance of peripheral device logic, the memory access control logic comprising:

memory transaction checking logic to receive memory transaction information of a memory transaction issued by an instance of peripheral device logic of the data processing system, wherein the memory transaction information comprises a stream identifier indicative of the instance of peripheral device logic;

main control register logic to store a value indicative of an address of a stream table, wherein the stream table comprises multiple entries, and wherein the multiple entries each comprise an owning subsystem identifier; and at least one instance of subsystem control register logic corresponding to each subsystem of the multiple subsystems, the at least one instance of subsystem control register logic to store memory access checking configuration information, wherein the memory transaction checking logic is responsive to reception of the memory transaction information:

to select an entry of the multiple entries of the stream table identified by the value indicative of the address of the stream table in dependence on the stream identifier;

to select at least one instance of subsystem control register logic corresponding to the subsystem identified by the owning subsystem identifier of the entry; and to cause enforcement of memory access rules in dependence on the memory transaction information and the memory access checking configuration information stored in the selected at least one instance of subsystem control register logic.

Figure 2:
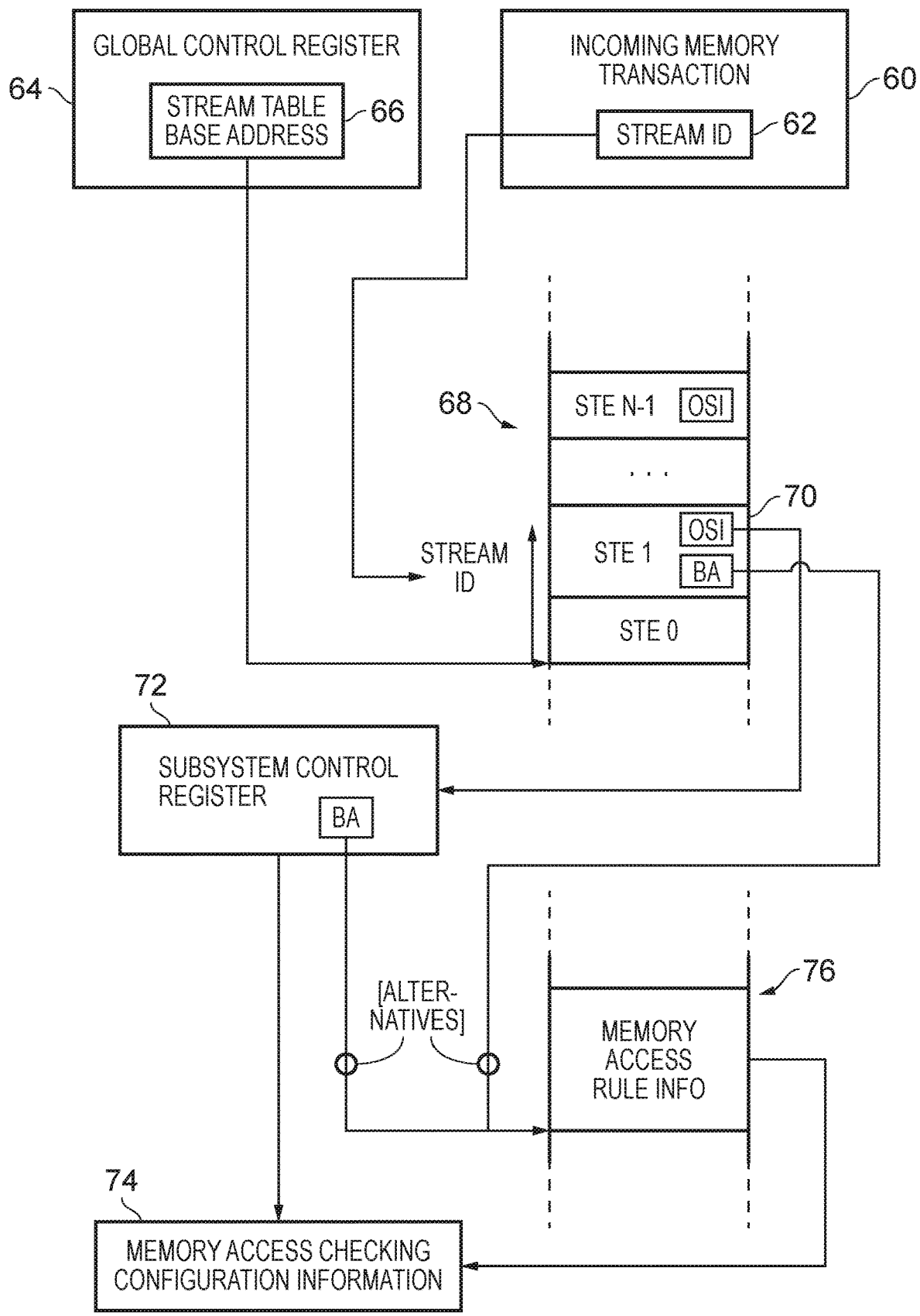
Figure 3:
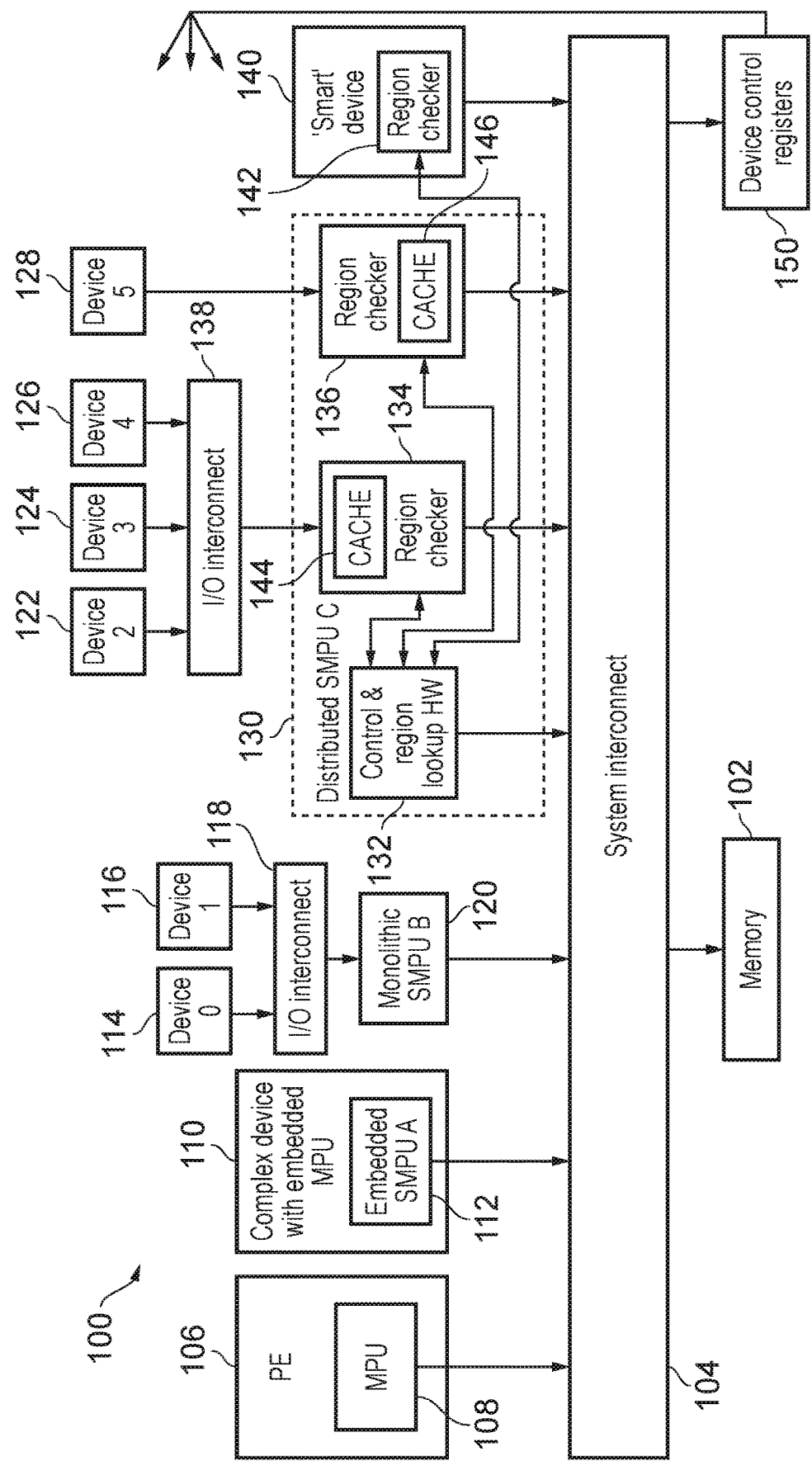
Figure 4:
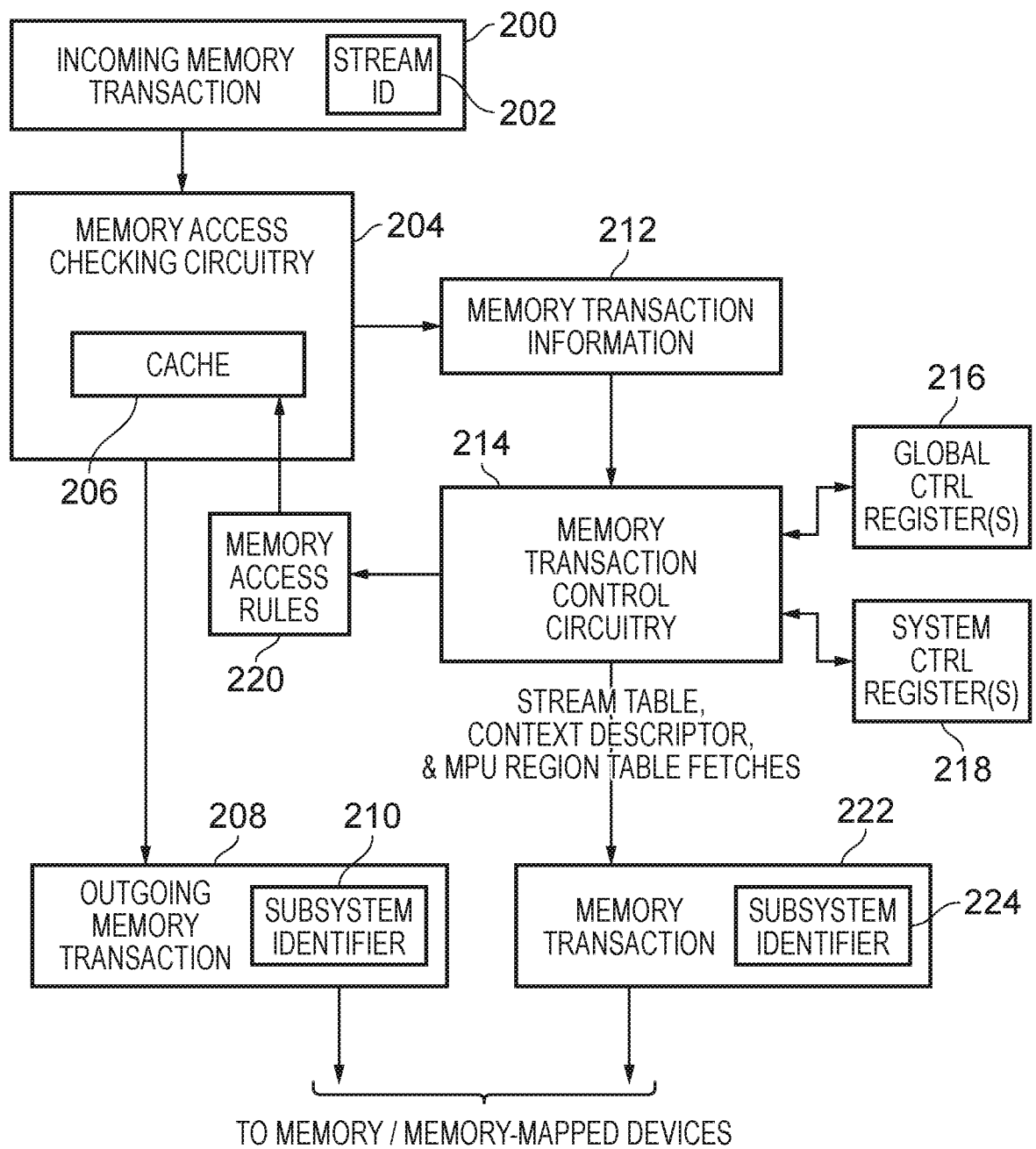
Figure 5:
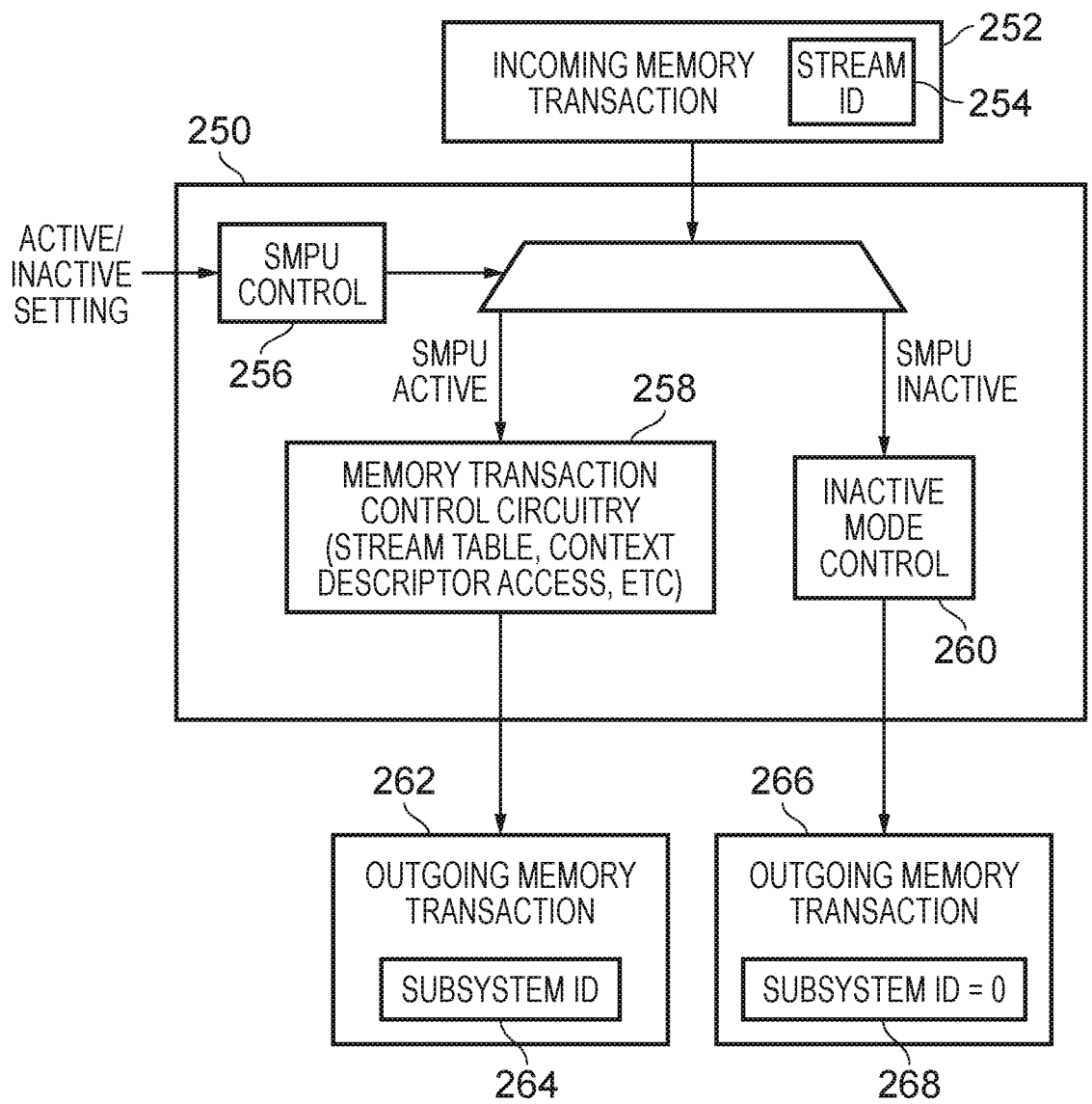
Figure 6:
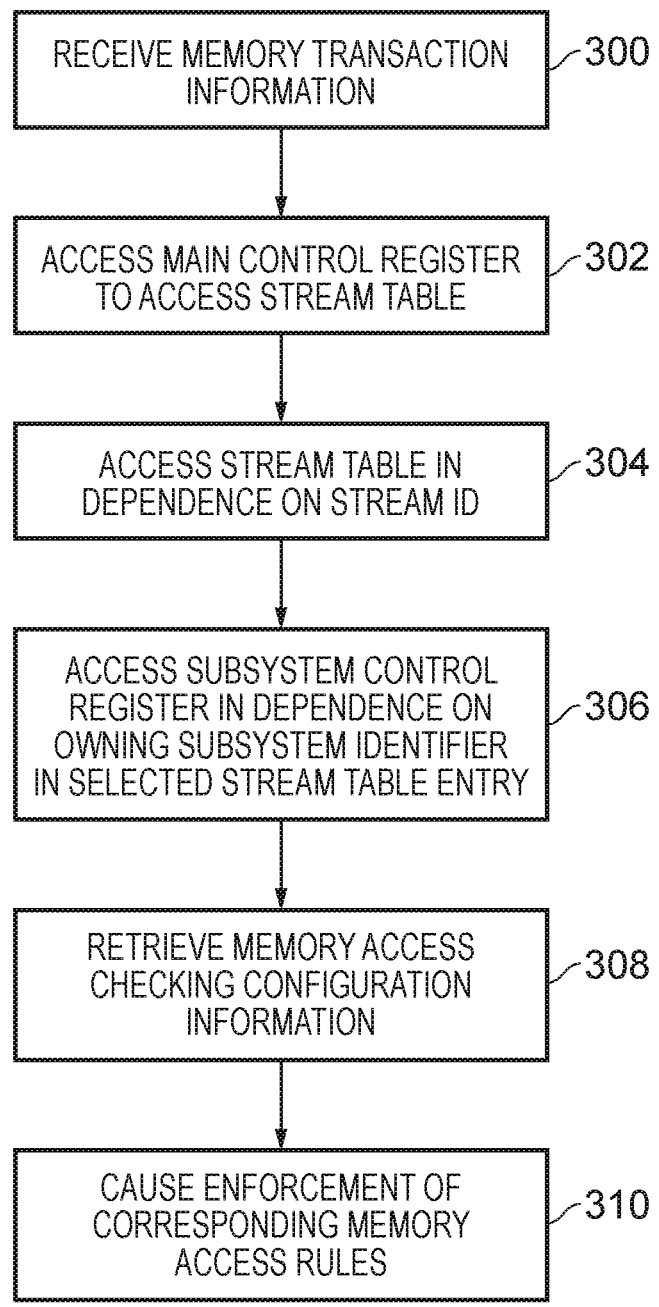
Figure 7:
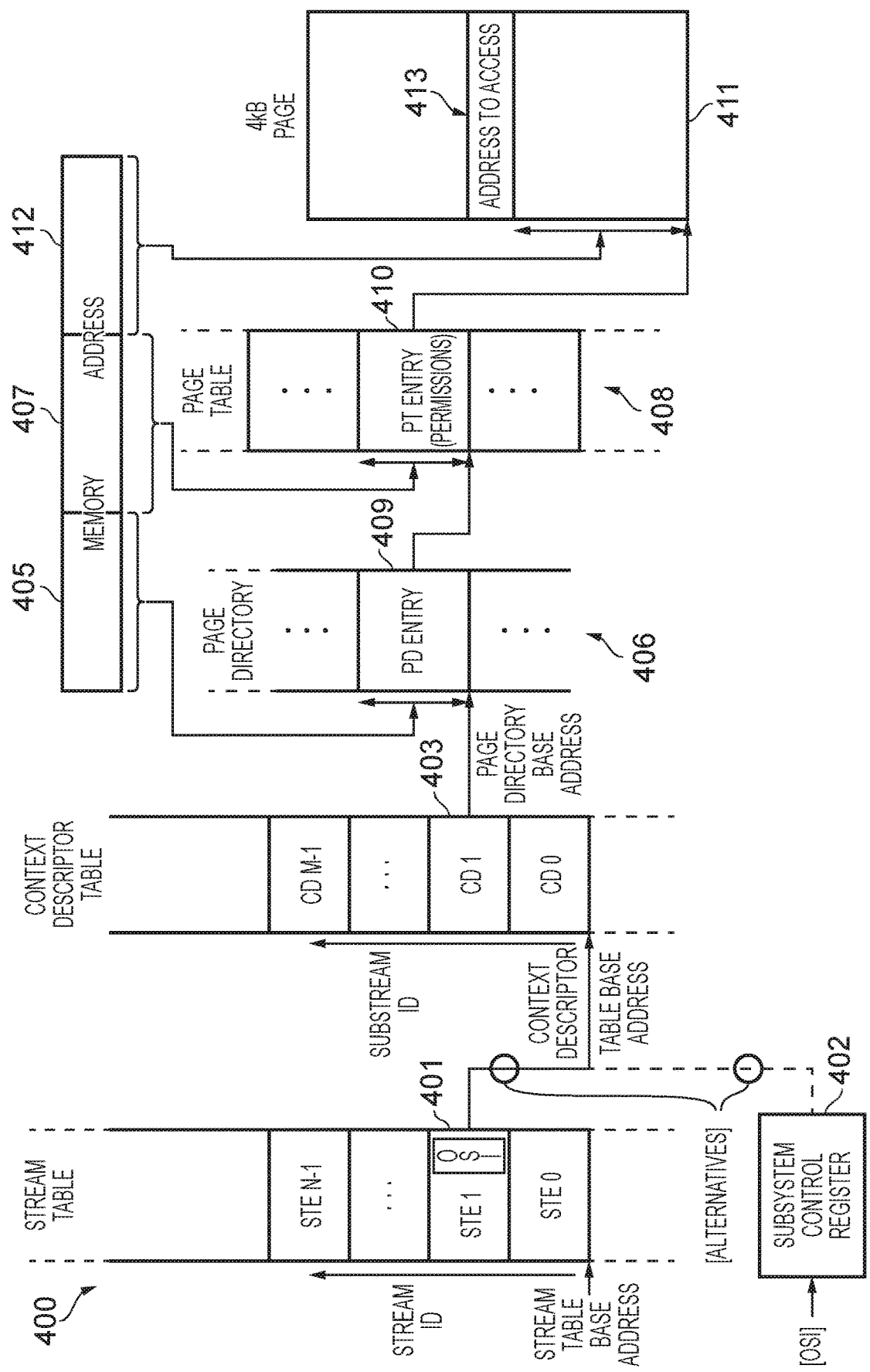
Figure 8A:
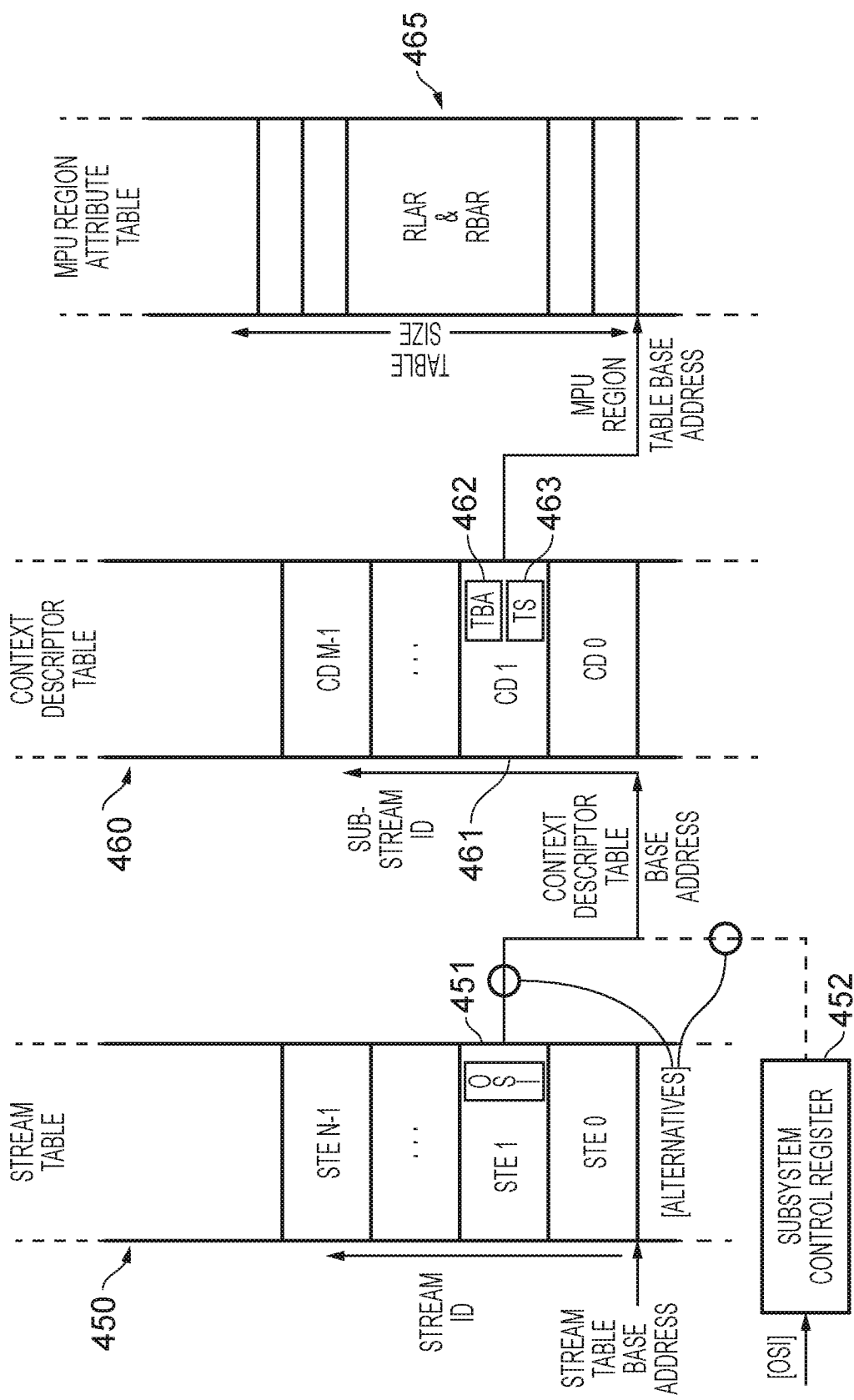
Figure 8C:
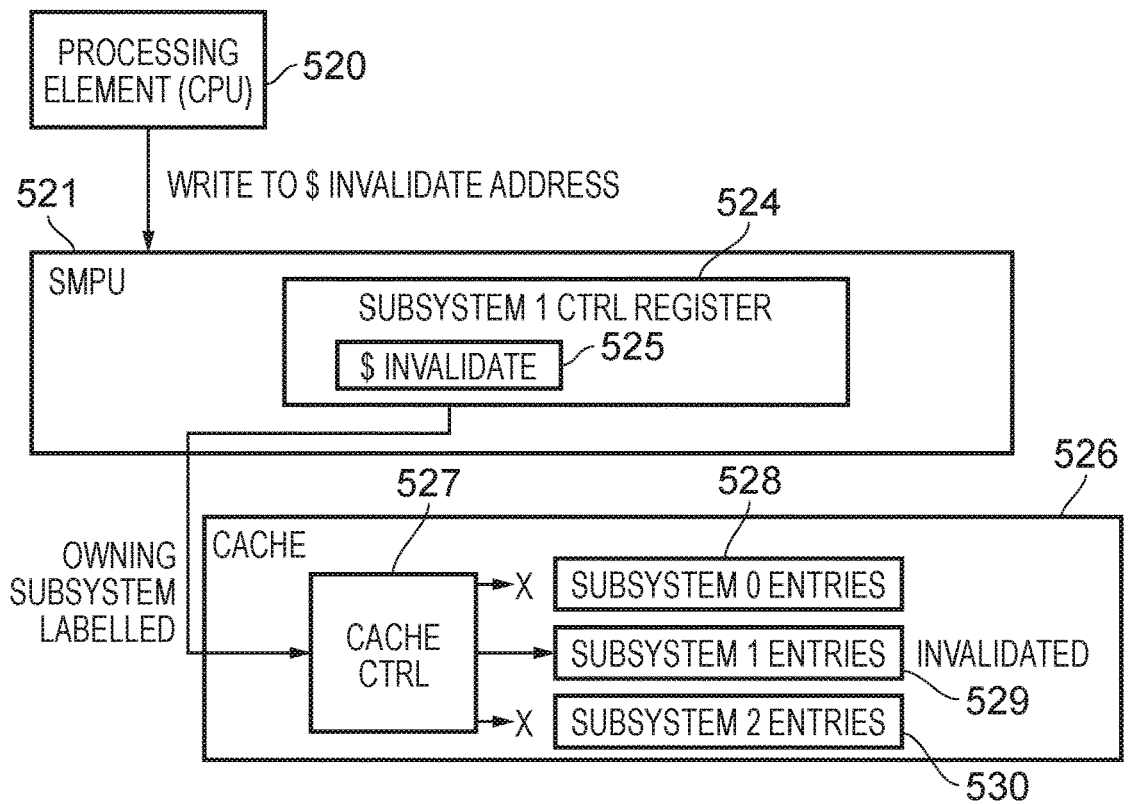
Figure 8B:
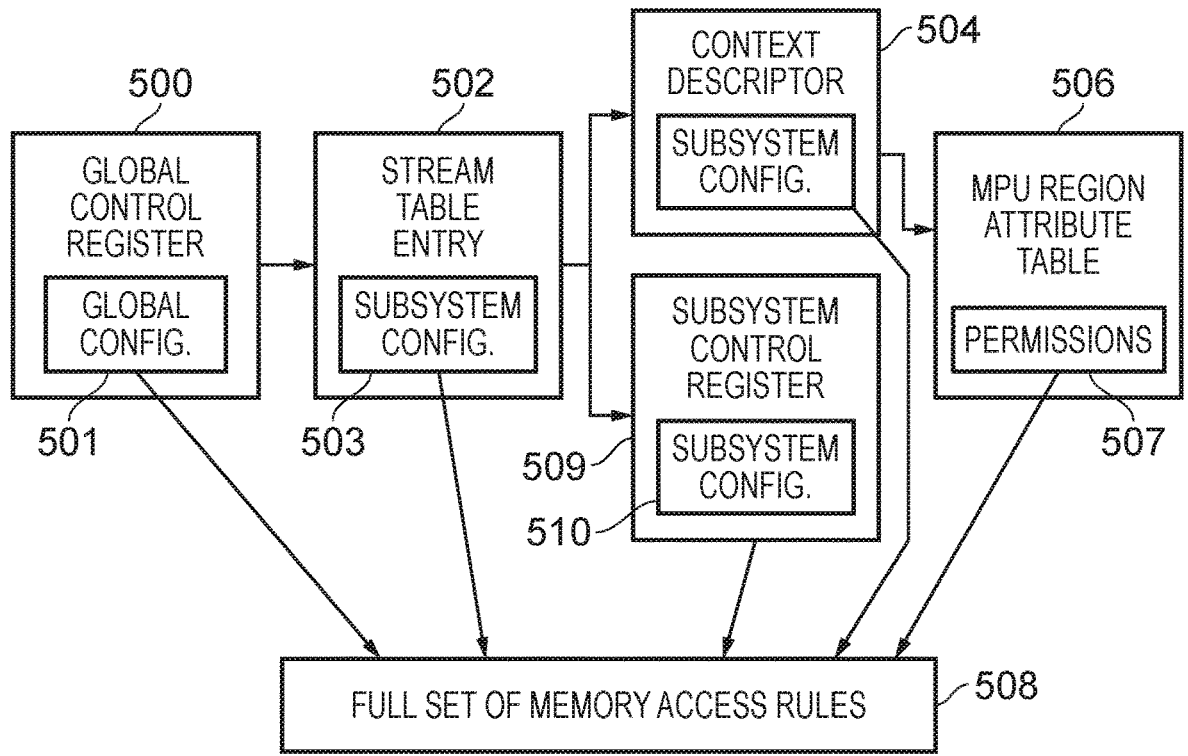
Figure 9:
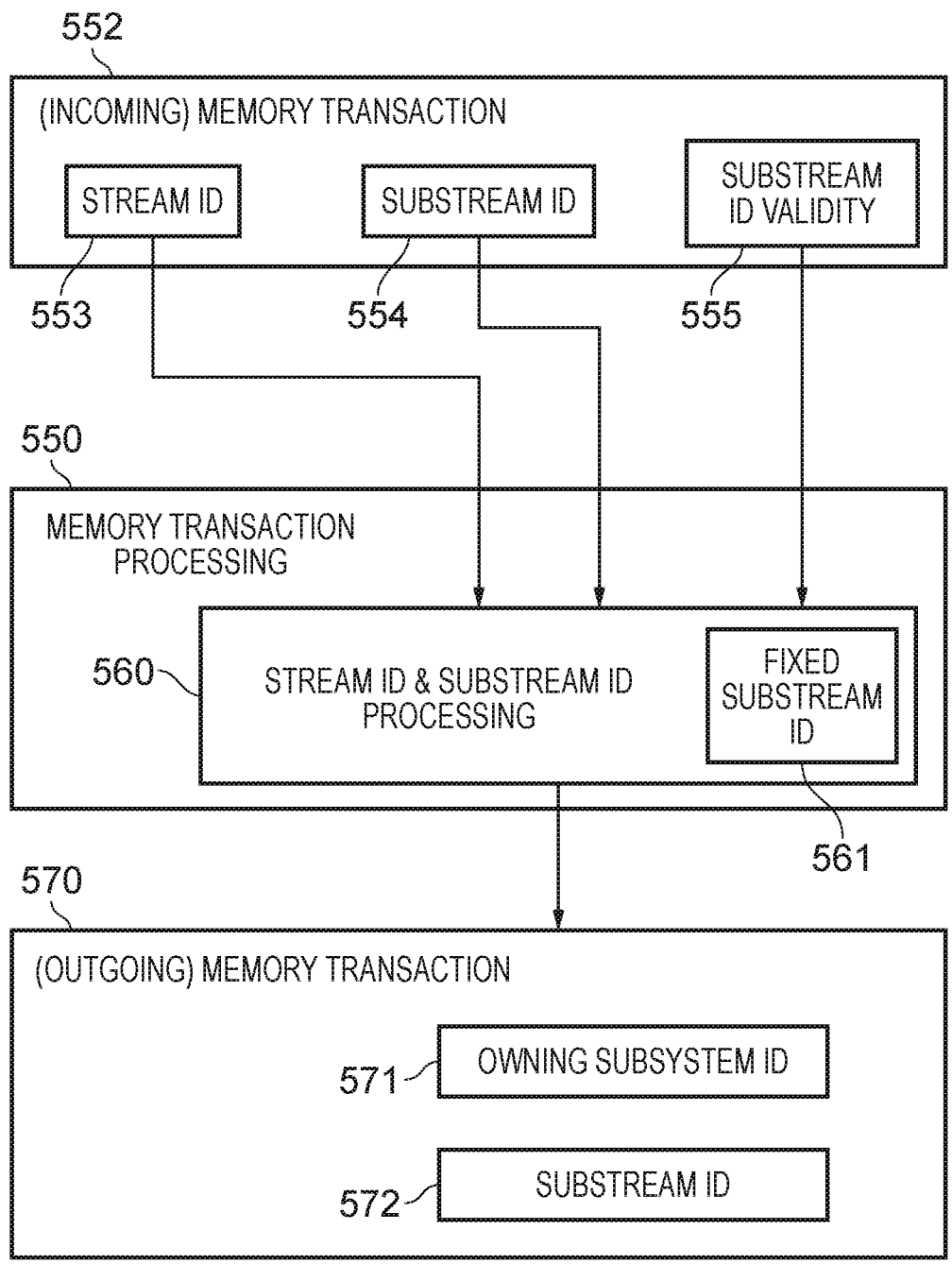
Figure 10:
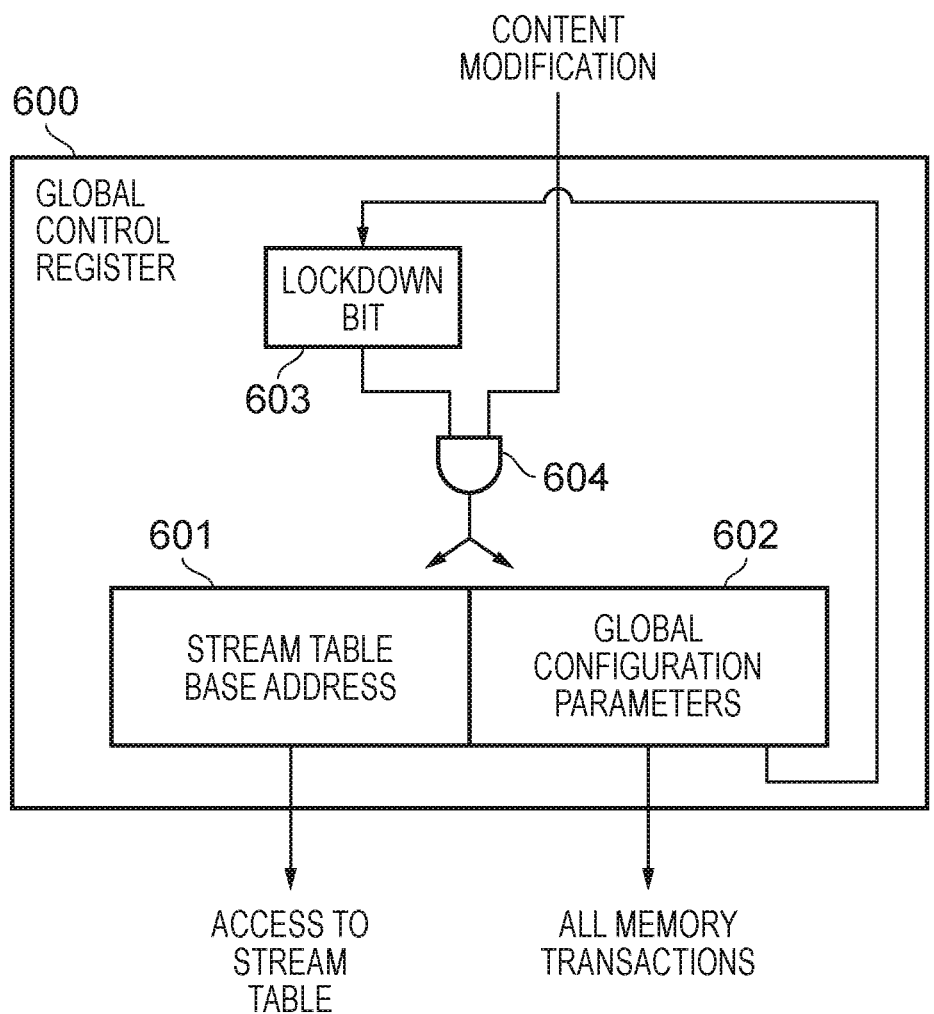
Figure 11:
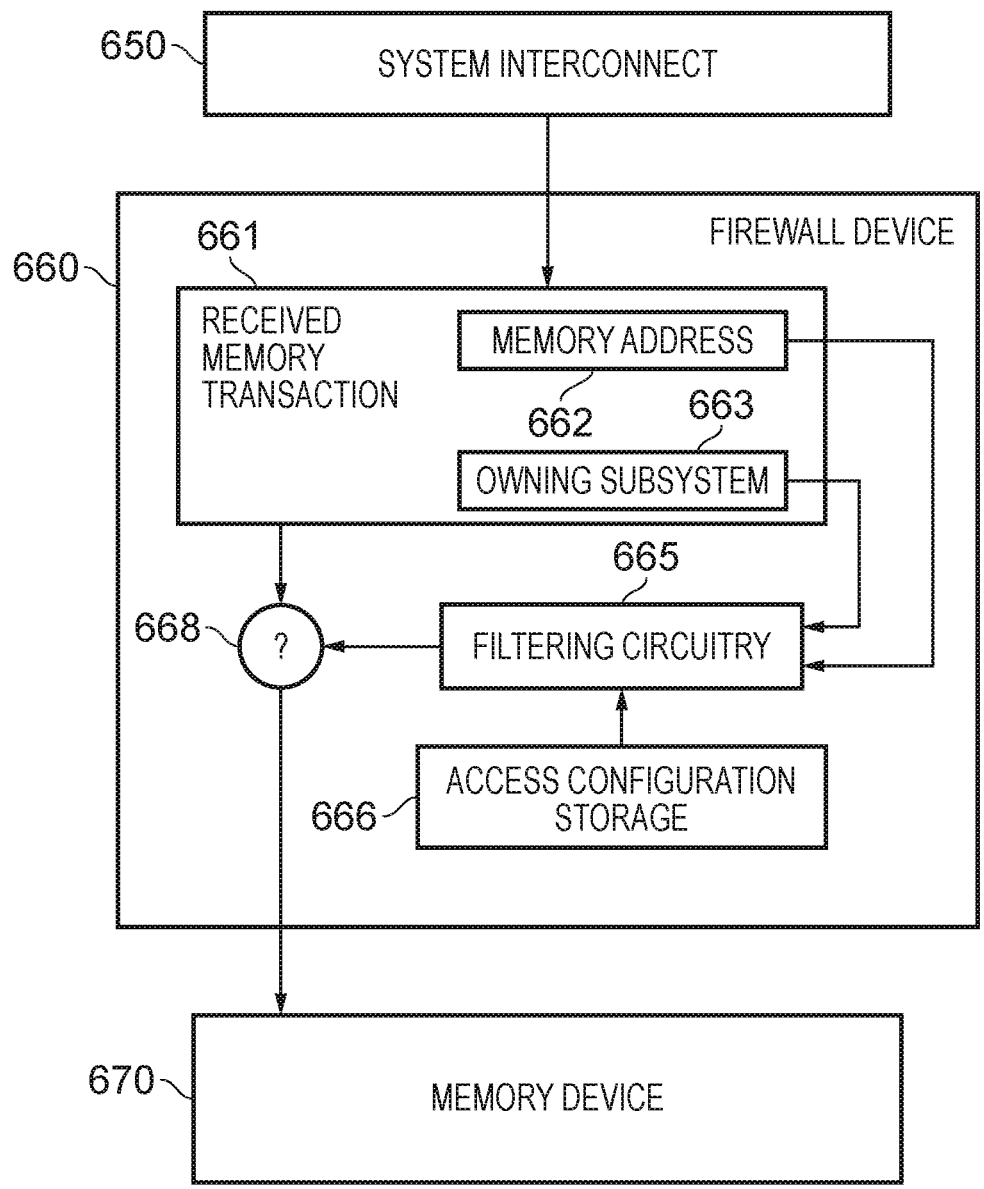
Figure 12:
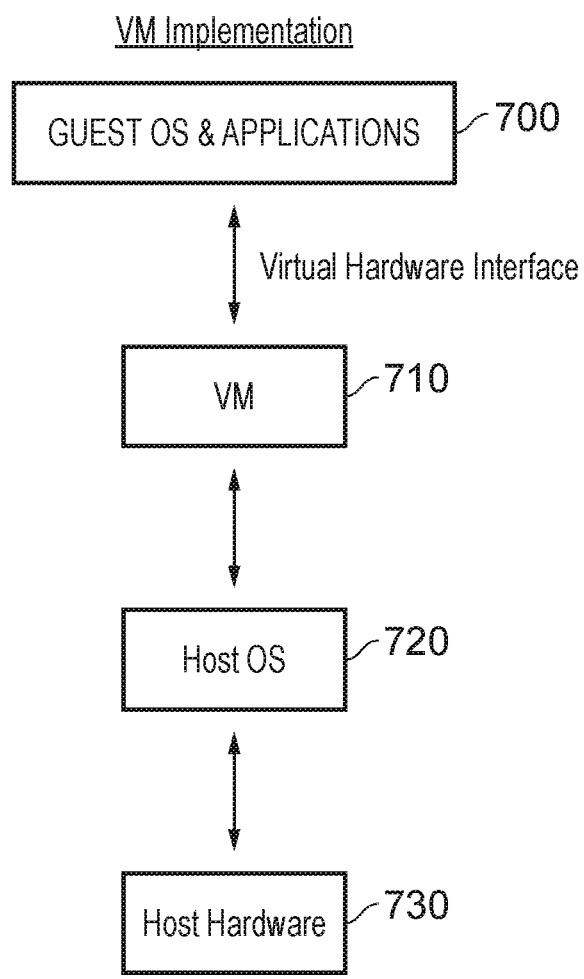

The present techniques will be described further, by way of example only, with reference to embodiments thereof as illustrated in the accompanying drawings, to be read in conjunction with the following description, in which:

FIG. 1 schematically illustrates a data processing system comprising multiple subsystems in accordance with some embodiments;

FIG. 2 schematically illustrates the use of a stream ID associated with a memory transaction to look up an owning subsystem identifier in a stream table and on that basis to access a corresponding subsystem control register and access memory access rule information and memory access checking configuration information in accordance with some embodiments;

FIG. 3 schematically illustrates a data processing system comprising multiple subsystems and comprising a variety of styles of system memory protection unit (SMPU) in accordance with some embodiments;

FIG. 4 schematically illustrates an apparatus using memory transaction information from an incoming memory transaction and information provided by global control registers and subsystem control registers to control various memory accesses including a corresponding outgoing memory transaction in accordance with some embodiments;

FIG. 5 schematically illustrates an apparatus for controlling memory access in a data processing system having an active mode and an inactive mode in accordance with some embodiments;

FIG. 6 is a flow diagram showing a sequence of steps which are taken according to the method of some embodiments in which memory transaction information is received and used to determine memory access checking configuration information and to cause enforcement of corresponding memory access rules;

FIG. 7 schematically illustrates a concatenated look up process in accordance with some embodiments, by which the stream ID of a memory transaction selects an entry in a stream table and the entry of the stream table selects a context descriptor table, and a substream ID selects an entry in the context descriptor table in order to determine memory access permissions in a page table hierarchy;

FIG. 8A schematically illustrates a concatenated look up process in accordance with some embodiments, in which a stream ID of a memory transaction selects an entry in a stream table, a substream ID selects an entry in a context descriptor table, and the entry in the context descriptor table provides an MPU region table base address and size;

FIG. 8B schematically illustrates the manner in which configuration data defining a set of memory access permissions may be gathered in a hierarchical manner as a global control register, a stream table, a context descriptor, and an MPU region attribute table are accessed in sequence according to some example embodiments;

FIG. 8C schematically illustrates the use of a memory mapped subsystem control register address to control a cache maintenance operation in some embodiments;

FIG. 9 schematically illustrates memory transaction processing circuitry in accordance with some embodiments which uses the stream ID of an incoming memory transaction to determine an owning subsystem ID to be applied to an outgoing memory transaction;

FIG. 10 schematically illustrates a global control register in accordance with some embodiments;

FIG. 11 schematically illustrates a firewall device according to some embodiments positioned between a system interconnect and a memory device; and FIG. 12 illustrates a simulator implementation that may be used.

In one example herein there is an apparatus for controlling memory access in a data processing system, wherein the data processing system when operating comprises multiple subsystems, each subsystem comprising at least one processing element and at least one peripheral device, the apparatus comprising:

memory transaction control circuitry to receive memory transaction information of a memory transaction issued by a peripheral device of the data processing system, wherein the memory transaction information comprises a stream identifier indicative of the peripheral device;

a main control register to store a value indicative of an address of a stream table, wherein the stream table comprises multiple entries, and wherein the multiple entries each comprise an owning subsystem identifier; and at least one subsystem control register corresponding to each subsystem of the multiple subsystems, the at least one subsystem control register to store memory access checking configuration information, wherein the memory transaction control circuitry is responsive to reception of the memory transaction information:

to select an entry of the multiple entries of the stream table identified by the value indicative of the address of the stream table in dependence on the stream identifier;

to select at least one subsystem control register corresponding to the subsystem identified by the owning subsystem identifier of the entry; and to cause enforcement of memory access rules in dependence on the memory transaction information and the memory access checking configuration information stored in the selected at least one subsystem control register.

The hierarchical arrangement of control registers used by the memory transaction control circuitry to determine the memory access checking configuration information to access for a given set of memory transaction information provides an arrangement in which individual control over its own memory access configuration can be afforded to each subsystem, yet where overall control of the arrangement is retained by a trusted entity in the system and carried out by the memory transaction control circuitry itself (for example, though not necessarily, as part of a system MPU (memory protection unit)). This is because the main control register is used to define where the stream table is to be accessed (e.g. by providing a base address or other value indicative of the address of the stream table) and this main control register is under the control of the trusted entity and cannot be modified by the (possibly mutually distrustful) subsystems. This therefore means that entries in the stream table can be trusted. Furthermore the entries in the stream table each comprise an owning subsystem identifier, such that the memory transaction control circuitry can reliably determine the owning subsystem to associate with each memory transaction received from a peripheral device. An identifier for the owning subsystem is then used to determine at least one subsystem control register corresponding to the subsystem, and the subsystem control register(s) (directly or indirectly) give the required memory access checking configuration information. Accordingly, where the memory transaction information comprises a stream identifier which indicates the peripheral device from which the memory transaction originated, this provides a reliable mechanism to ensure that memory transactions received from the peripheral devices are correctly associated with the subsystems to which they belong and on that basis the correct memory access checking configuration information can be retrieved and used for the enforcement of memory access rules appropriate to the memory transaction and the peripheral device which generated it.

The required information in order to enforce the appropriate memory access rules may take a variety of forms. In some embodiments the memory access checking configuration information may relatively directly provided the memory transaction control circuitry with this required information. In some embodiments a further layer of look up may be employed in order to derive further required information to configure the memory access rules. Accordingly in some embodiments, the enforcement of the memory access rules is further in dependence on additional memory access checking configuration information, wherein the additional memory access checking configuration information comprises:

a context descriptor table, wherein the context descriptor table has multiple context descriptors, each context descriptor comprising a value indicative of the address of a memory region attribute table; and memory region attribute definitions accessed by the memory transaction control circuitry in dependence on the value indicative of the address of a memory region attribute table, wherein the address of the context descriptor table is determined in dependence on one of:

a further value in the selected entry of the stream table; and a further value in the selected at least one subsystem control register.

Thus context descriptor tables can be used to allow access to the required configuration information in particular by providing value indicative of the address of a memory region attribute table. This value may therefore be directly the address itself, it may indicate only a portion of the address (sufficient to uniquely identify it), or it may for example indicate a further location at which the required address information is to be found. Furthermore the address of the context descriptor table may be determined from different sources and embodiments provide that this address may be determined in dependence on one of: a further value in the selected entry of the stream table; and a further value in the selected at least one subsystem control register.

The context descriptor tables may be accessed in a variety of ways under the control of the information found in the stream table, but in some embodiments the memory transaction information further comprises a substream identifier indicative of an originating context in the peripheral device of the memory transaction and wherein accessing the additional memory access checking configuration information in dependence of the value indicative of the address of a context descriptor table comprises:

selecting a context descriptor from the context descriptor table identified by the value indicative of the address of a context descriptor table, in dependence on the substream identifier;

retrieving the value indicative of the address of a memory region attribute table from the selected context descriptor; and accessing a memory region attribute table identified by the value indicative of the address of the memory region attribute table to retrieve at least one of the memory region attribute definitions.

Thus in such an arrangement, where the memory transaction information provides a substream identifier indicative of an originating context in the peripheral device for the memory transaction, this allows a plurality of contexts to be supported in any of the peripheral devices and distinguished between in terms of memory access control. Accordingly a context descriptor can be selected from the context descriptor table in dependence on that substream identifier. The corresponding memory region attribute table can then be accessed to retrieve at least one memory region attribute definition appropriate to the originating context. This provides a further level of isolation between the plurality of contexts a given peripheral device is operating on behalf of.

A context descriptor stored in the context descriptor table may hold various information relevant to controlling the memory access, and in some embodiments the context descriptor selected in the context descriptor table also stores a value indicative of the memory region attribute table size and accessing the memory region attribute table comprises accessing an area of memory defined by the value indicative of the address of a memory region attribute table and the value indicative of the memory region attribute table size. This thus provides a flexible and configurable manner of accessing the appropriate memory region attributes from the memory region attribute table so defined. It will be appreciated that the size of the memory region attribute table may be encoded in a variety of ways, for example it could be directly specified in a field in the context descriptor, or a field in the context descriptor may be used to indirectly derive the size (for example by raising 2 to the power of the value of the field). In some embodiments multiple fields of the context descriptor together may be indicative of the size of the memory region attribute table. For example the context descriptor may contain a memory region attribute table upper address (or limit address), which when combined with the memory region attribute table base address is indicative of the size of the memory region attribute table. In other embodiments the size of the memory region attribute table may be fixed, and therefore there may be no need to store a value indicative of the memory region attribute table size in the context descriptor.

Memory region attribute definitions may be defined in a variety of ways, but in some embodiments the at least one memory region attribute definition retrieved includes additional memory access rule information comprising permissions information and the at least one memory region attribute definition retrieved further comprises values indicative of the start and end addresses of the memory region. Hence these values could for example be explicit start and end addresses, they could be a start address and a length, or any other equivalent mechanism allowing the required block of memory to be defined.

The memory region attribute table may be provided in a variety of ways, but in some embodiments the memory region attribute table identified by the value indicative of the address of a memory region attribute table forms part of a page table hierarchy and the additional memory access rule information comprises permission information defined in the page table hierarchy.

In some embodiments in which the memory transaction information further comprises a substream identifier indicative of an originating context in the peripheral device of the memory transaction, further information may be provided in the memory transaction information to indicate the validity (or conversely the invalidity) of such a substream identifier in the memory transaction information. In other embodiments the invalidity of substream identifier may be encoded by using an invalid value for the substream identifier, for example a value of 0 may be chosen to encode that the substream identifier is not valid. Accordingly in some embodiments the memory transaction control circuitry is further responsive to a substream identifier validity marker in the memory transaction information, when the substream identifier validity marker indicates an invalidity of the substream identifier, to perform the selection of the entry in the context descriptor table in dependence on a predetermined substream identifier. Thus, rather than using the substream identifier forming part of the memory transaction information, a substitute (predetermined) substream identifier is used to perform the selection of the entry in the context descriptor table. This default selection thus can allow the memory transaction to proceed, but where it is limited to the accesses which are allowed by the memory region attribute table which is then caused to be accessed. A further aspect of control over memory accesses for peripheral devices in the data processing system is thus provided.

The apparatus may, in some embodiments, receive incoming memory transactions itself and then also itself enforce the relevant memory access rules in dependence on the memory transaction information and the memory access checking configuration information. In other embodiments the apparatus may provide the control mechanism for determining the relevant memory access rules in dependence on the memory transaction information and the memory access checking configuration information without itself receiving the incoming memory transactions. For example another system component may receive the incoming memory transactions and refer the relevant memory transaction information to the apparatus.

Further, the apparatus may be configured to issue outgoing memory transactions. Thus, in some embodiments the apparatus further comprises a memory transaction transmission interface to issue an outgoing memory transaction targeting a data storage device of the data processing system, wherein the outgoing memory transaction comprises an assigned owning subsystem identifier. The memory transaction transmission interface may be used to forward incoming transactions that pass the relevant memory access rules. The memory transaction transmission interface may be used to transmit transactions generated by the memory transaction control circuitry to the various memory tables (e.g. the stream table, context descriptor table, or a memory region attribute table). This then means that the recipient of these outgoing memory transactions can then refer to the assigned owning subsystem identifier to determine correct accesses (and conversely denials of access). Where such a recipient then only has to filter based on subsystem identifiers, this simplifies its configuration since it does not need to know about the relationship of the peripheral devices to their owning subsystems. Furthermore it reduces the number of bits that need to be carried on the system interconnect. In some embodiments a single memory transaction transmission interface may be used to both forward incoming transactions, and for transactions generated by the memory transaction control circuitry. In other embodiments separate memory transaction transmission interfaces may be used, with the interface being used to forward incoming transactions being part of another component in the system that receives the incoming transactions from a peripheral.

Where the stream table itself may be stored in memory, and therefore accessed by means of a memory transaction, the memory transaction control circuitry may issue its own memory transactions in order to retrieve the relevant content of the stream table (as described above), when causing the enforcement of memory access rules. Such stream table accesses can then be labelled in variety of ways to ensure their security, and some embodiments the memory transaction control circuitry is further responsive to reception of the memory transaction information: to cause a first outgoing memory transaction to be issued by the memory transaction transmission interface to access the stream table, wherein a first assigned owning subsystem identifier in the first outgoing memory transaction is one of: a predetermined value indicative of a valid subsystem; and a value indicating that the first outgoing memory transaction does not have an associated owning subsystem identifier.

Further, when a subsequent memory access is then used to access the memory access checking configuration information in dependence on the address of the context descriptor table, such subsequent memory access transactions can also be labelled by their owning subsystem. Accordingly in some embodiments the memory transaction control circuitry is further responsive to reception of the memory transaction information: to cause a second outgoing memory transaction to be issued by the memory transaction transmission interface to access the memory access checking configuration information in dependence on the address of the context descriptor table, wherein a second assigned owning subsystem identifier in the second outgoing memory transaction is determined in dependence on the owning subsystem identifier of the selected entry of the stream table.

In a similar manner, a further subsequent memory access may then used to access a memory region attribute table and this memory access transactions can also be labelled by their owning subsystem. Accordingly in some embodiments the memory transaction control circuitry is further responsive to reception of the memory transaction information: to cause a third outgoing memory transaction to be issued by the memory transaction transmission interface to access the memory region attribute table in dependence on the value indicative of the address of the memory region attribute table, wherein a third assigned owning subsystem identifier in the third outgoing memory transaction is determined in dependence on the owning subsystem identifier of the selected entry of the stream table.

The memory transaction control circuitry may be arranged to operate in a number of different modes. It may for example be arranged to have an inactive mode, wherein the above described access to the stream table in a main control register and to at least one subsystem control register does not occur in response to received memory transaction information. The apparatus may however not be entirely inactive in such a state, and in some embodiments the memory transaction control circuitry is further responsive to reception of the memory transaction information, when the apparatus is set to be in an inactive mode, to cause all outgoing memory transactions issued by the memory transaction transmission interface to have one of: the predetermined value indicative of a valid subsystem as the assigned owning subsystem identifier; and a value indicating that the transaction does not have an associated owning subsystem identifier.

Either or both of the main control register and the entries of the stream table may also be used to provide further configuration parameters for the configuration of outgoing memory transactions (such as those triggered by reception of the memory transaction information, for example to access various configuration data in memory). Thus in some embodiments the memory transaction control circuitry is further responsive to reception of the memory transaction information to cause at least one outgoing memory transaction issued by the memory transaction transmission interface in association with the received memory transaction information to be configured in accordance with at least one of: further configuration parameters in the main control register; and further configuration parameters in the selected entry of the stream table. Similarly the subsystem control registers may also be used to provide further configuration parameters for the configuration of outgoing memory transactions (such as those triggered by reception of the memory transaction information, for example to access various configuration data in memory). Thus in some embodiments the memory transaction control circuitry is further responsive to reception of the memory transaction information to cause at least one outgoing memory transaction issued by the memory transaction transmission interface in association with the received memory transaction information to be configured in accordance with further configuration parameters in the at least one subsystem control register corresponding to each subsystem of the multiple subsystems. The memory transaction control circuitry may use such configuration parameters to cause the modification of incoming memory transactions that pass their memory access rule checks before they are forwarded.

Certain subsystem control registers may be used to control operations performed for respective subsystems. Such subsystem control registers may be configured to store subsystem readable and writeable data (which may comprise subsystem configuration parameters), but may also be configured such that a write to at least one address within a target subsystem control register will trigger a certain memory-related operation on behalf of that subsystem. Thus in some embodiments the memory transaction control circuitry is further responsive to reception of a register write transaction, when the register write transaction specifies a write to at least one address within a target subsystem control register, to cause all operations initiated as a result of the write to the at least one address within the target subsystem control register to be restricted by the owning subsystem identifier associated with the register write transaction. Accordingly, whatever the nature of the operation triggered by the write to this target subsystem control register, that operation is then constrained by the owning subsystem identifier, i.e. so that the operation may only cause effects for the owning subsystem and is prevented to from causing (direct) effects for any other subsystem. In some embodiments the subsystem control registers may be memory mapped and the register write transaction may comprise a memory write transaction that targets the address of the register. In other embodiments the register write transaction may comprise a register specific write transaction that may be differently encoded to a memory write transaction.

As set out above, the operations initiated as a result of the write to the at least one address within the target subsystem control register may take a variety of forms, but in some embodiments an operation initiated as a result of the write to the at least one address within the target subsystem control register is a cache invalidation operation, and wherein the apparatus further comprises a cache, and the cache invalidation operation is restricted to cache content associated with the owning subsystem identifier. Thus in this example only cache content belonging to the owning subsystem will be invalidated and cache content belonging to other subsystems will be left unamended. In some embodiments the cache may comprise a context descriptor cache used to cache entries from a context descriptor table. Alternatively or in addition, some embodiments may include a memory region attribute table entry cache used to cache entries from memory region attribute tables.

In some embodiments each peripheral device is only associated with a single stream identifier, which it uses to label all memory transactions which it generates. However other embodiments provide that a given peripheral device can be associated with plural stream identifiers. Having a plurality of stream identifiers associated with one peripheral device allows that peripheral device to distinguish (in terms of the memory transactions it issues) between operations which it performs of behalf of, say for entirely separate (and not mutually trusting) system components and this thus supports a separation of and security isolation between those two worlds. Thus in some embodiments at least one peripheral device of the data processing system is a multi-stream-identifier peripheral associated with more than one stream identifier, wherein the more than one stream identifiers for the multi-stream-identifier peripheral are associated with mutually independent operations of the multi-stream-identifier peripheral. For example, a peripheral device for performing encryption (such as a dedicated cryptographic accelerator) may perform encryption operations on behalf of various system components, and in particular on behalf of different subsystems. This use of multiple stream identifiers thus supports the security isolation between those "users" of this hardware.

The mutually independent operations of the peripheral may be associated with the same subsystem, but may also be associated with different subsystems. Accordingly in some embodiments the mutually independent operations of the multi-stream-identifier peripheral are each associated with different subsystems of the multiple subsystems of the data processing system.

Various techniques may be employed to protect the integrity of the main control register, but in some embodiments the main control register further comprises lockdown bit storage to store a lockdown bit, wherein modification of the content of the main control register is not permitted when the lockdown bit has a predetermined lockdown bit value. Thus, once the lockdown bit has the predetermined lockdown bit value the integrity of the content of the main control register is assured. For example, at system start-up trusted software can configure the system configuration including the content of the main control register and once it is correctly configured can finally set the lockdown bit to the predetermined lockdown bit value. This may mean that the processing element (CPU) that ran the trusted software at start up can subsequently be used to run untrusted software, without any risk to the integrity of the contents of the main control registers.

The enforcement of the memory access rules may be provided in a variety of ways. For example in some embodiments the memory transaction control circuitry may enforce the memory access rules, allowing only permitted memory transactions to continue and blocking those memory transactions which violate the memory access rules. However in other embodiments one or more further components may be provided in order to carry out the enforcement. Hence, whilst the memory transaction control circuitry determines the applicable memory rules for a given memory transaction, those applicable memory rules are enforced by the one or more further components. For example in some embodiments the apparatus further comprises memory transaction filtering circuitry responsive to reception of the memory transaction to determine from the memory transaction information and the memory access checking configuration information whether the memory transaction is permitted, and when the memory transaction is permitted the memory transaction filtering circuitry is arranged to modify the memory transaction to include the owning subsystem identifier. Where the memory transaction is then labelled with its owning subsystem identifier, this then provides an efficient mechanism for recipients of the memory transaction to determine whether the memory transaction should proceed or not. For example, this efficiency is supported by the fact that the stream identifier is no longer required to be carried by the memory transaction.

Hence according to such arrangements the apparatus may be part of a data processing system comprising further components, where at least one of those further components is responsive to memory transactions which it receives to filter the memory transactions on the basis of the owning subsystem identifier value. Such filtering can for example protect a given target memory device and the components thereby acts as a firewall. This further component can then also have its own set of configuration data, in dependence on its positioning within the data processing system, against which to compare the owning subsystem identifier value and determine whether it should be allowed to proceed to the target memory device. Accordingly in some embodiments there is a data processing system comprising the apparatus as described above, and further comprising: a further filtering device to receive the memory transaction after the apparatus has modified the memory transaction, wherein the further filtering device comprises: a memory transaction reception interface to receive the memory transaction, wherein the memory transaction specifies a value indicative of at least a portion of a memory address, and the owning subsystem identifier value indicative of an owning subsystem; access configuration storage; and further memory transaction filtering circuitry responsive to reception of the memory transaction by the memory transaction reception interface: to forward the memory transaction to a target memory device when content of the access configuration storage indicates that memory transactions having the owning subsystem identifier value indicative of the owning subsystem are permitted to access a memory location associated with the value indicative of at least a portion of a memory address; and to block the memory transaction to the target memory device when the content of the access configuration storage does not indicate that memory transactions having the owning subsystem identifier value indicative of the owning subsystem are permitted to access the memory location associated with the value indicative of at least a portion of a memory address.

The access configuration storage may be configured in a variety of ways in dependence on the system requirements, but in some embodiments the content of the access configuration storage comprises an access permission for each owning subsystem for the target memory device. In some embodiments the content of the access configuration storage comprises access permissions for memory regions within the target memory device for each owning subsystem.

The combination of the filtering performed by the memory access checking circuitry and the firewall may provide both efficient isolation of different contexts within a subsystem and efficient isolation between different subsystems.

In one example herein there is a method of controlling memory access in a data processing system, wherein the data processing system when operating comprises multiple subsystems, each subsystem comprising at least one processing element and at least one peripheral device, the method comprising:
receiving memory transaction information of a memory transaction issued by a peripheral device of the data processing system, wherein the memory transaction information comprises a stream identifier indicative of the peripheral device;
storing a value indicative of an address of a stream table in a main control register, wherein the stream table comprises multiple entries, and wherein the multiple entries each comprise an owning subsystem identifier;
storing memory access checking configuration information in at least one subsystem control register corresponding to each subsystem of the multiple subsystems; and
in response reception of the memory transaction information:
selecting an entry of the multiple entries of the stream table identified by the value indicative of the address of the stream table in dependence on the stream identifier;
selecting at least one subsystem control register corresponding to the subsystem identified by the owning subsystem identifier of the entry; and
causing enforcement of memory access rules in dependence on the memory transaction information and the memory access checking configuration information stored in the selected at least one subsystem control register.

In one example herein there is an apparatus for controlling memory access in a data processing system, wherein the data processing system when operating comprises multiple subsystems, each subsystem comprising at least one processing element and at least one peripheral device, the apparatus comprising:
means for receiving memory transaction information of a memory transaction issued by a peripheral device of the data processing system, wherein the memory transaction information comprises a stream identifier indicative of the peripheral device;
means for storing a value indicative of an address of a stream table in a main control register, wherein the stream table comprises multiple entries, and wherein the multiple entries each comprise an owning subsystem identifier;
means for storing memory access checking configuration information in at least one subsystem control register corresponding to each subsystem of the multiple subsystems;
means for selecting an entry of the multiple entries of the stream table identified by the value indicative of the address of the stream table in dependence on the stream identifier in response to reception of the memory transaction information;

means for selecting at least one subsystem control register corresponding to the subsystem identified by the owning subsystem identifier of the entry; and means for causing enforcement memory access rules in dependence on the incoming memory transaction information and the memory access checking configuration information stored in the selected at least one subsystem control register.

In one example herein there is a computer program for controlling a host data processing apparatus to provide an instruction execution environment comprising:

memory access control logic for controlling memory access in a data processing system, wherein the data processing system when operating comprises multiple subsystems, each subsystem comprising at least one instance of processing element logic and at least one instance of peripheral device logic, the memory access control logic comprising:

memory transaction checking logic to receive memory transaction information of a memory transaction issued by an instance of peripheral device logic of the data processing system, wherein the memory transaction information comprises a stream identifier indicative of the instance of peripheral device logic;

main control register logic to store a value indicative of an address of a stream table, wherein the stream table comprises multiple entries, and wherein the multiple entries each comprise an owning subsystem identifier; and at least one instance of subsystem control register logic corresponding to each subsystem of the multiple subsystems, the at least one instance of subsystem control register logic to store memory access checking configuration information, wherein the memory transaction checking logic is responsive to reception of the memory transaction information:

to select an entry of the multiple entries of the stream table identified by the value indicative of the address of the stream table in dependence on the stream identifier;

to select at least one instance of subsystem control register logic corresponding to the subsystem identified by the owning subsystem identifier of the entry; and to cause enforcement of memory access rules in dependence on the memory transaction information and the memory access checking configuration information stored in the selected at least one instance of subsystem control register logic.

Some particular embodiments are now described with reference to the figures.

FIG. 1 schematically illustrates a data processing system 10 in some example embodiments. The data processing system comprises two data processing elements (i.e. processors or CPUs) 12, 14 which are connected into the remainder of the data processing system via the system interconnect 16. This system interconnect 16 provide interconnection generally and in particular access for the processing elements to memory devices such as the SRAM 18 and the flash memory 20. Note that FIG. 1 also shows a set of peripheral control registers 22 which are memory mapped control registers and therefore may be addressed by master devices in the data processing system (such as the processing elements) using the memory addresses to which they are mapped. In the illustrated example of FIG. 1 each of these memory devices is separated from the system interconnect via a firewall device 24, 26, 28, which is arranged to filter memory transactions which are seeking to access the respective connected memory device in a manner which will be described in more detail below. The flash memory device 20 is shown to have an associated cache 30. Each of the processing elements 12, 14 is shown to also have its own memory protection unit (MPU) 32, 34 which checks memory transactions generated by software executing on the respective processing element against defined memory access rules. Three peripheral devices 36, 38, 40 are also shown in FIG. 1 forming part of the data processing system 10. These peripheral devices are connected via the I/O interconnect 42. The I/O interconnect 42 is then connected to the system interconnect 16 via the system memory protection/management unit (SMPU/SMMU) 44. The SMPU/SMMU 44 thus checks the memory transactions from multiple peripherals. The ownership and control of these peripherals may belong to multiple (possibly mutually distrustful) subsystems. In the example illustration of FIG. 1 there are two subsystems shown, one ("subsystem 0") based on the processing elements 12 and another ("subsystem 1") based on processing element 14. As shown by the dashed line 46, subsystem 0 comprises processing element 12, peripheral 36, and peripheral 38. As shown by the dashed line 48, subsystem 1 comprises processing element 14, peripheral 40, and peripheral 38. Accordingly peripheral 38 is shared by the two subsystems. Similarly the SRAM device 18, the cache 30 and the flash device 20, and the peripheral control registers 22 are also shared by the two subsystems. As will be described in more detail below with reference to the figures which follow, memory transactions coming in to the SMPU/SMMU 44 from the peripherals 36, 38, 40 have a stream ID that indicates which peripheral the transaction originated from. In some cases, for example where a peripheral shared between subsystems (as in the case of peripheral 38), a peripheral may have multiple stream IDs associated with it such that distinction can be made between operations of that peripheral within each respective subsystem. It should be recognised that the defined subsystems of the data processing data system 10 are a feature of the data processing system when operating, in the sense that before the data processing system boots up the peripheral devices may not necessarily be associated with any particular subsystem, but as part of the start-up of the data processing system configuration may be imposed (by trusted software) which allocates the peripheral devices to one or more of the subsystems of the data processing system.

The SMPU/SMMU 44 uses the stream ID associated with a memory transaction received from one of the peripheral devices and a series of tables in memory to determine the memory access rules applicable to the memory transaction. These memory mapped tables comprise a main control register from which it is determined where to find a stream table, and an entry within the stream table is referenced using the stream ID associated with a memory transaction to derive an owning subsystem identifier to associate with the memory transaction. The owning subsystem identifier is then also used to select at least one subsystem control register which corresponds to that subsystem, where various configuration information relevant to memory access checking for this memory transaction is stored. That configuration information may be used (at least in part) directly to provide rules for checking the memory transaction and may be used (at least in part) indirectly, i.e. by pointing to further storage locations where rules for checking the memory transaction are stored. By changing the owning subsystem identifier of an entry within the stream table, the associated stream ID can be assigned to a different subsystem. Since different peripherals are associated with different stream IDs, the owning subsystem identifier can control which subsystem a peripheral is owned and controlled by.

FIG. 2 schematically illustrates the manner in which some of the information and tables mentioned above with respect to FIG. 1 are used and interact according to some embodiments. An incoming memory transaction 60 (for example as received by the SMPU/SMMU 44 in the example configuration of FIG. 1) comprises a stream ID 62. A global control register 64 (which may also be known as the main control register) provides the location in memory of the stream table. As indicated in FIG. 2 this may be by means of the global control register 64 explicitly holding the stream table base address 66. However it will be recognised that the location in memory of the stream table could be provided in other ways by a value in the global control register 64, for example by an abbreviated address (yet still sufficient to uniquely identify the stream table location) or by a pointer indicating where the address of the stream table is to be found. Alternatively the global control register 64 could specify the upper address of the stream table in memory. The stream table 68 stored in memory is then accessed, whereby the stream ID 62 provided with the incoming memory transaction 60 is used to select one of the multiple entries of the stream table. In the example illustrated in FIG. 2 an entry 70 of the stream table ("STE 1") is selected. The entries in the stream table provide an owning subsystem identifier ("OSI"), which indicates the subsystem with which the peripheral that generated the incoming memory transaction is associated. On the basis of this owning subsystem identifier a subsystem control register 72 is then accessed (there being a different subsystem control register provided for each subsystem in the data processing system and indeed some subsystems may have more than one subsystem control register). The subsystem control register 72 then provides configuration information which defines the memory access checking which must be carried out for the memory transaction 60. This memory access checking configuration information 74 may therefore be provided at least in part directly by the subsystem control register 72, but may also be provided at least in part by referring to memory access rule information 76 stored in memory. This memory access rule information 76 can be accessed by means of a base address giving its starting point in memory. FIG. 2 illustrates two alternatives for the provision of this base address. In a first example the base address ("BA") is also stored in the stream table entry 70 of the stream table 68 which was accessed. In a second example the base address ("BA") is stored in the subsystem control register 72. Once more it will be recognised that the location in memory of the memory access rule information 76 could be provided in other ways by a value other than the explicit address, for example by an abbreviated address (yet still sufficient to uniquely identify the memory location), by a pointer indicating where the address of the information is to be found, or by a value specifying the upper address of the table.

The apparatus which performs the role of the SMMU/SMPUs described above can take a number of forms and some of these are schematically illustrated in FIG. 3. FIG. 3 schematically illustrates a heterogeneous data processing system 100. A range of different devices which generally have access to memory 102 via the interconnect 104 are shown. The complex device 110 contains its own inbuilt memory access checking capability comprising an embedded SMPU 112. Two peripheral devices 114, 116 are connected via the I/O interconnect 118 to a "standalone" (monolithic) SMPU 120, via which all memory transactions which they generate pass in order to reach system interconnect 104. Peripheral devices 122, 124, 126, 128 are connected to the system interconnect 104 via the distributed SMPU 130. The key components of the SMPU 130 are the control and region look up hardware 132 and at least one region checker 134, 136. The region checkers 134 and 136 are under the control of the control and region lookup hardware 132, although can perform some memory transaction checking independently, where this has previously been orchestrated by the control and region lookup hardware 132. Previously retrieved memory access rules and permissions may be stored in the respective caches 144, 146 of the region checkers 134, 136 to facilitate faster handling of similar memory transactions in future. Thus when one of the region checkers 134, 136 receives a memory transaction for which it already has the required rules and permissions available, it may handle the memory transaction checking without further reference to the control and region look up hardware 132. However for a "new" memory transaction for which it does not have the required rules and permissions available, the necessary information (in particular the stream ID of the memory transaction and the memory address(es) for which access is sought) are passed to the control and region look up hardware 132, which then refers to one or more main control registers and subsystem control registers in the manner described herein in order to derive the required rules and permissions, which can then be made passed back to the region checker to use independently. The peripheral devices 122, 124, 126 are connected to the region checker 134 via the I/O interconnect 138. The peripheral device 128 is connected to the region checker 136. A further 'smart' device 140 comprises its own region checker 142, which is nonetheless also associated with (and under the control of) the control and region lookup hardware 132. Thus a range of different peripheral devices in the data processing system 100 shown in FIG. 3 share access to memory 102, as well as to the memory mapped device control registers 150. The various configurations of SMPU shown provide the memory access checking capability to ensure that the valid memory transactions generated by the peripheral devices are correctly checked and controlled, even though the respective peripheral devices belong to plural subsystems in the data processing system. Explicit allocation of peripheral devices to subsystems is not shown in FIG. 3, but in principle any number of subsystems could be defined for the operating data processing system shown and each peripheral device may be allocated to one or more of those subsystems.

As mentioned above with reference to FIG. 3, the techniques described herein may be carried out in a variety of ways by a system component generally referred to as an SMPU. FIG. 3 gives various examples of the ways in which such an SMPU could be provided, including in particular the distributed SMPU 130. According to this arrangement there are fundamentally two parts to the SMPU, a first which has overall control of the process (e.g. the control and region look up hardware 130) and a second which is arranged to perform specific memory access checking tasks (e.g. the region checkers 134, 136, 142). FIG. 4 provides an example embodiment in which a subdivision of the tasks in this manner is implemented. An incoming memory transaction 200 (comprising a stream ID 202) is received by the memory access checking circuitry 204. The memory access checking circuitry 204 comprises a cache 206 in which previously required memory access checking parameters are stored. Referring to the parameters of the incoming memory transaction, in particular its stream ID 202 and the memory address to which access is sought, the memory access checking circuitry 204 firstly looks up in its cache 206 whether the required memory access checking parameters are currently stored there. When they are, the memory access checking circuitry 204 enforces the memory access rules defined by those parameters with respect to the incoming memory transaction. Thus, the incoming memory transaction 200 may be blocked if it is in violation of those memory access rules, or may be allowed to pass if it satisfies them. An outgoing memory transaction 208 from the memory access checking circuitry 204 comprises a subsystem identifier 210 (originally determined as described below by the action of the memory transaction control circuitry 214). When a lookup by the memory access checking circuitry 204 and its cache 206 results in a miss, the memory access checking circuitry 204 passes memory transaction information 212 to the memory transaction control circuitry 214. The memory transaction information 212 comprises the necessary information for the memory access checking parameters to be determined and thus comprises the stream ID 202 and the address to which the incoming memory transaction 200 is seeking access. In response to receipt of the memory transaction information 212, the memory transaction control circuitry refers to the global control register(s) 216 in order to determine the base address of the stream table. The memory transaction control circuitry 214 then generates a memory transaction of its own in order to fetch the content of an entry of the stream table. The particular entry fetched is determined by the stream ID 202. Then from the information returned, including an owning subsystem identifier, the memory transaction control circuitry 214 then refers to a selected subsystem control register 218 in order to retrieve memory access checking configuration information applicable to the memory transaction 200 received. This configuration information may, in some embodiments, provide all the information required to define the memory access rules 220 required, which can then be passed back to the memory access checking circuitry 204 (and stored in the cache 206). However in the embodiments illustrated in FIG. 4 the selected subsystem control register 218 provides the base address of a context descriptor table stored in memory. Hence the memory transaction control circuitry 214 then once more generates a memory transaction of its own in order to fetch the content of a particular context descriptor from the context descriptor table. Indeed, in the example of FIG. 4, the content of the context descriptor received provides two parameters: an MPU region attribute table base address and an attribute table size. This information thus defines a block of memory which should be accessed in order to retrieve these required attributes. This is also done by means of the memory transaction control circuitry 214 generating a further memory transaction in order to retrieve these attributes. Once so retrieved, these attributes define the memory access rules 220, which are passed back to the memory access checking circuitry 204 and stored in its cache 206. Note also that the memory transactions 222 generated by the memory transaction control circuitry 214 also comprises a subsystem identifier 224. Whilst there is a unique subsystem identifier associated with each defined subsystem in the data processing system, there is also a specific subsystem identifier which is used by the system for identifying memory transactions associated with a higher level of system privilege than that associated with any of the subsystems. In some example embodiments, such as that illustrated in FIG. 4, this is a subsystem ID of zero. Hence access to the stream table generated by the memory transaction control circuitry 214 has a subsystem identifier of zero. Where the stream table is owned and protected by an entity in the data processing system with the above-mentioned higher level of system privilege than any of the subsystems, those subsystems (which could only cause memory access request with their own subsystem identifier associated with them to be forwarded) cannot modify the stream table, which can be protected by filtering and only allowing write transactions with the subsystem identifier of zero to reach it. Subsequently the above-mentioned accesses to the context descriptor table and the MPU region attribute table are carried out with memory transactions having a subsystem identifier according to the owning subsystem identifier derived from the stream table for the memory transaction received.

FIG. 5 schematically illustrates an apparatus in some example embodiments. Here the memory transaction control circuitry is embodied as an SMPU 250. The SMPU 250 is arranged to receive incoming memory transaction 252 (having associated stream identifier 254). How the SMPU 250 handles this incoming memory transaction 252 depends on its current operating mode. The SMPU 250 has two modes: an active mode and an inactive mode. Which of the modes the SMPU 250 operates in is defined by a signal received by the SMPU 250 ("active/inactive") and originates from a trusted system entity (such as a global control register 64). This signal may alternatively be considered to be an enable/disable signal. However it is important to note that when the SMPU 250 is in its inactive mode (or "disabled") this does not mean that it is entirely transparent to the incoming memory transaction 252. Specifically when the SMPU 250 is in its inactive mode all memory transactions which are passed through it are given a subsystem identifier of zero. As in the example embodiment described with respect to FIG. 4 this subsystem identifier is associated with an entity in the data processing system operating a higher level of privilege than any of the subsystems. It will be understood therefore that the inactive mode of the SMPU 250 is a special configuration which does not provide the usual protection between the subsystems which follows when the SMPU 250 is active. The SMPU 250 comprises SMPU control circuitry 256 which receives the active/inactive signal and on that basis controls which of two paths an incoming memory transaction takes through the device. When the SMPU 250 is enabled, the incoming memory transaction 252 is handled by memory transaction control circuitry 258, which may for example operate in the manner described above of the memory transaction control circuitry 214 of FIG. 4. Conversely when the SMPU 250 is disabled, the incoming memory transaction 252 is passed via the inactive mode control circuitry 260, which reformats the incoming memory transaction to have the subsystem identifier zero (instead of whichever stream ID 254 it had on receipt). It will be appreciated that another predetermined value other than zero may be used, as the value itself is not critical. Accordingly when the SMPU 250 is active the memory transaction control circuitry 258 generates outgoing memory transactions 262 with an associated subsystem identifier 264 determined in accordance with the techniques described herein (by reference to the stream table, context descriptor table, and so on), and when the SMPU 250 is in the inactive mode control 260 causes the memory transaction passed through the SMPU to be mapped to a subsystem identifier of zero, such that an outgoing memory transaction 266 is passed further, with the subsystem identifier 268 set to zero. It will be appreciated that in some embodiments there may be one path through the SMPU 250 and transactions may pass through the memory transaction control circuitry 258 when the SMPU 250 is both active and inactive. In such an embodiment the memory transaction control circuitry 258 may be disabled when the SMPU is inactive, such that memory access rules are not applied and the assigned subsystem ID defaults to zero instead of being derived from an entry in the stream table. Therefore while the organisation of the circuitry may be different, the way in which transactions are handled when the SMPU 250 is active and inactive may be the same as shown in FIG. 5

FIG. 6 is a flow diagram showing a sequence of steps according to an example method embodiment of the present techniques. The flow begins at step 300 when memory transaction information is received. It will be appreciated from the above discussion of FIGS. 3 and 4 that the entity receiving this memory transaction information may also be the recipient of the memory transaction itself, but this is not necessarily the case and a separate entity may have received the memory transaction and passed on the relevant memory transaction information. Having received the memory transaction information, at step 302 a main (global) control register is accessed in order to determine the base address of a stream table. As this information is stored in the global control registers it can't be changed by the (possibly mutually distrustful) subsystems. Similarly the memory addresses associated with the stream table 68 may not be writable by the (possibly mutually distrustful) subsystems. This in turn means that the values in the entries of the stream table can also be trusted. Thus at step 304 the stream table is accessed in dependence on the stream ID forming part of the memory transaction information received, in order to select a particular entry therein. The stream table entry comprises an owning subsystem field defining the subsystem to which the peripheral which was the origin of the memory transaction belongs. This owning subsystem field is then used to determine which of the subsystem control registers should be used to govern the rest of the transaction checking. Hence at step 306 the selected subsystem control register is accessed in dependence on the owning subsystem identifier in the selected stream table entry. The content of this selected subsystem control register provides at least part of the required memory access checking configuration information and this is retrieved at step 308. As noted elsewhere herein this may comprise some information defining the required memory access rules being provided directly by the content of the selected subsystem control register, but may also comprise the required information being derived via further accesses, for example to context descriptor table and an MPU region attribute table. Thus in the final step 310 of FIG. 6 enforcement of the corresponding memory access rules for the memory transaction are enforced. It is mentioned again that the recipient of the memory transaction may or may not be the entity which performs the above described steps 300-308, and thus the enforcement of the memory access rules may be carried out by the same entity which perform steps 300-308 or once the relevant memory rules have been determined they may be signalled back to the separate recipient of the memory transaction for enforcement.

FIG. 7 schematically illustrates a concatenated look up process in order to derive memory access rule information and then to access a specified memory address (when the memory access rules so allow) according to some embodiments. On the basis of a stream table base address (provided either directly or indirectly by global control registers), an access is made to a stream table 400. In dependence on the stream ID for the memory transaction an entry in the stream table 400 is selected, which in the example shown in FIG. 7 is the entry 401 (STE 1). The stream table entry provides the owning subsystem identifier (OSI) and in one of the alternatives shown in FIG. 7 provides the base address of a context descriptor table. In other embodiments the location of the context descriptor table may be identified by the entry specifying the address of the top of the table, or a partial address that still uniquely identifies the location of the table. FIG. 7 however also shows an alternative (dashed line) according to which the context descriptor table base address (or other value identifying the location of the context descriptor table) is provided by a subsystem control register 402 (this particular subsystem control register having been selected on the basis of the OSI indicated by STE1. The context descriptor table is then accessed, wherein an entry 403 (a context descriptor CD) in the context descriptor table is selected in dependence on a substream identifier forming part of the received memory transaction. Substream identifiers are used by the peripherals to distinguish between different contexts in which they may generate memory transactions. In the example shown in FIG. 7 the context descriptor 403 (CD1) is selected. The content of the selected context descriptor here provides a page directory base address via which a page table hierarchy can be accessed. In a similar way to other memory location specifying values, alternatively the address of the top of the page directory could be specified, and/or a partial address that still uniquely identifies the page directory could be used. Then the page table hierarchy is traversed in the usual manner, whereby portions of the memory address received are used in order to determine the "path" taken through the page table hierarchy. Thus as shown in FIG. 7 a first portion 405 of the memory address is used to determine a page directory entry 409 from the page directory 406, where the page directory entry points to a page table entry in the page table 408. A second portion 408 of the (virtual) memory address is used to select a set of permissions data from the page table entry 410 and the page table entry 410 further indicates a 4 kB page 411, whereby a final portion 412 of the memory address is used to select within that 4 kB page an entry giving the address translation (i.e. the physical address to access 413, assuming the permissions allow this memory transaction to proceed). For clarity FIG. 7 illustrates a simplified page table hierarchy with only two levels of lookup and it will be appreciated that deeper page table hierarchies may be used to handle wider memory addresses.

FIG. 8A schematically illustrates a concatenated look up process in order to derive memory access rule information according to some embodiments. On the basis of a stream table base address (provided either directly or indirectly by global (main) control registers), an access is made to a stream table 450. In dependence on the stream ID for the memory transaction an entry in the stream table 450 is selected, which in the example shown in FIG. 8A is the entry 451 (STE 1). The stream table entry provides the owning subsystem identifier (OSI) and in one of the alternatives shown in FIG. 8A provides the base address (or other value uniquely identifying the location in memory) of a context descriptor table. FIG. 8A however shows an alternative (dashed line) according to which the context descriptor table base address (or other value uniquely identifying the location in memory) is provided by a subsystem control register 452 (this particular subsystem control register having been selected on the basis of the OSI indicated by STE1). The context descriptor table 460 is then accessed, wherein an entry 461 (a context descriptor CD) in the context descriptor table is selected in dependence on a substream identifier of the memory transaction. In the example shown in FIG. 8A the context descriptor 461—CD1) is selected. The content of the selected context descriptor here provides an MPU region table base address 462 and a table size 463 (or other values identifying the location and size of the table, for example a bottom and top address). Using this information an MPU region attribute table 465 is accessed from which two data items are derived: a specified MPU Region Base Address Register (RBAR) payload and a specified MPU Region Limit Address Register (RLAR) payload. According to the scheme used here an individual MPU region is defined by a lower address derived from RBAR and an upper address derived from RLAR. In some embodiments the RBAR and RLAR payloads may also contain permissions information that applies to the region of memory specified by the base and limit addresses. In this way the combination of the RBAR and RLAR values may specify both a region of memory, and the permissions associated with it. Further detail of how the lookup of MPU regions may be performed can be found in UK patent publication 2575878.

FIG. 8B schematically illustrates the manner in which configuration data defining a set of memory access rules may be gathered in a hierarchical manner as a global (main) control register, a stream table, a subsystem control register, a context descriptor, and an MPU region attribute table are accessed in sequence according to some example embodiments. Accordingly when global control register 500 is accessed (in order to determine the base address of the stream table), the global control register 500 can also provide further global configuration parameters 501 which are to be applied to all memory transactions. Next, when a stream table entry 502 in the stream table is accessed on the basis of a stream identifier, the stream table entry can also provide further subsystem configuration parameters 503 which are to be applied to all memory transactions under the control of this subsystem. After that, when a context descriptor 504 is accessed on the basis of a substream identifier, the context descriptor can also provide further substream specific configuration parameters 505 which are applied to all memory transactions which come from this substream of the peripheral. Additional subsystem specific configuration parameters 510 may be accessed from the subsystem control registers 509 in dependence on an owning subsystem identifier obtained from the stream table entry. Finally an MPU region attribute table 506 is accessed providing permissions information 507 applicable to the memory transaction. Accordingly the full set of memory access permissions 508 to be applied to the memory transaction may be derived from a number of sources where those sources are hierarchy arranged. The hierarchical nature this manner of gathering configuration parameters can determine where it is appropriate to provide a particular item of configuration information in the hierarchy. Most storage efficiency is gained by the use of the global configuration parameters 501, although these have the least granularity since there are applied to all memory transactions. At the other end of the spectrum the specific permissions information 507 have the finest granularity, but this requires greater storage since such permissions data 507 is stored for each MPU region defined.

FIG. 8C schematically illustrates the use of a memory mapped subsystem control register address to control a cache maintenance operation in some embodiments. It is arranged that memory transactions to memory mapped subsystem control registers issued by a processing element (CPU) 520 are received by the SMPU 521. One of the memory mapped subsystem control registers which the SMPU uses as part of its memory access control activities is the subsystem 1 control register 524 (i.e. which is rated to the control of devices within subsystem 1 of the data processing system). Some memory addresses within the subsystem 1 control register 524 are used to control various memory operations related to subsystem 1. In the example shown I FIG. 8C one such address (cache invalidate 525) is arranged to trigger a cache invalidation operation for this subsystem. Specifically, when a write is made to this address (regardless of any "write data" nominally associated with that write), the cache operation is triggered. This process is illustrated in FIG. 8C, where the processing element 520 sends a write memory transaction specifying this subsystem 1 cache invalidation address 525. The subsystem 1 control register 524 handles this memory transaction and the memory transaction that is forwarded to the cache 526 is labelled with the owning subsystem identifier that identifies subsystem 1 (as the memory transaction targeted the address of a memory mapped register associated with subsystem 1). The cache 526 is shown as holding entries 528 associated with subsystem 0, entries 529 associated with subsystem 1, and entries 530 associated with subsystem 2. Cache control circuitry 527 of the cache 526 then ensures that only those entries 529 associated with subsystem 1 are invalidated. In some embodiments other parts of the system (for example the firewall device 28 in FIG. 1) may block access to the subsystem control registers for subsystem 1 if the access doesn't originate from the processing element associated with subsystem 1 or another trusted processing entity.

FIG. 9 schematically illustrates the manner in which circuitry in some embodiments deals with the substream ID which may be provided with a memory transaction. Transaction processing circuitry 550 is shown, which may be an independent device and form part of another device, or may be part of any of the forms of SMPU described herein (for example as shown in FIG. 3). An incoming memory transaction 552 is illustrated comprising a stream ID 553, a substream ID 554, and a substream ID validity bit 555. These items of information are received by the stream ID and substream ID processing circuitry 560 of the memory transaction processing circuitry 550. The stream ID processing carried out is generally as described elsewhere herein, i.e. the memory transaction processing circuitry 550 refers to a stream table using the stream ID 553 to select a particular stream table entry, which provides an owning subsystem identifier for this memory transaction. Here the stream ID and substream ID processing circuitry 560 also receives the substream ID 554 and the substream ID validity bit 555 Accordingly the substream ID validity bit 555 can be used by the system to control whether the substream ID 554 should be considered valid for this memory transaction or not. When the substream ID validity bit 555 indicates that the substream ID 554 is valid then it is not amended, whereas when the substream ID validity bit 555 indicates that the substream ID 554 is not valid then a fixed substream ID 561 (which in some embodiments is zero) is substituted. Accordingly the outgoing memory transaction 570 comprises an owning subsystem identifier 571 and a substream ID 572, where the substream ID 572 may be identical to the substream ID 554 (the substream ID was valid) may have been set to a predetermined value (substream ID was invalid). In some embodiments the amended substream ID value may only be required inside by the memory transaction processing circuitry in order to perform check against the memory access rules. In such embodiments the substream ID may be stripped off the outgoing memory transaction to reduce the number of signals required in the system interconnect 16.

FIG. 10 schematically illustrates the configuration of a global (main) control register 600 according to some embodiments. In this example the global control register 600 is shown to hold a stream table base address 601 and a set of global configuration parameters 602. As illustrated the stream table base address provides access to the stream table, whilst the global configuration parameters may be applied to the memory transactions that the SMPU 44 handles, or otherwise affect the operation of the SMPU. The global control register 600 is further shown to comprise a lockdown bit 603. This lockdown bit is used in association with any (attempted) content modification for the global control register, whether that modification seeks to modify the stream table base address 601 or the global configuration parameters 602. Typically, modification of the content of the global control register only takes place when the data processing system, of which the global control register forms part, is being initially configured by a trusted entity within the data processing system operating at a high level of system privilege. Note that the lockdown bit 603 is used to gate any attempted content modification, represented in FIG. 10 by the AND gate 604. Accordingly only when the lockdown bit 603 has a predetermined value (e.g. say 0), which it is arranged to have when the data processing system is first initialised, can content of the global control register the modified. Note also that the path by which the lockdown bit 603 is set comes from one of the global configuration parameters 602. This configuration provides that initially the trusted system entity can configure the stream table base address 601 and the global configuration parameters 602 appropriately for the subsequent operation of the data processing system desired, but as a final modification to the global configuration parameters as part of its initialisation configuration actions the trusted system entity modifies the lockdown bit 603. Specifically it rewrites it to have its "locked down" value (e.g. 1 to continue the example above). This therefore means that no further modification to the stream table base address 601 and the global configuration parameter 602 (and indeed to the lockdown bit 603) is possible. The only way for these parameters to be changed is for a full system initialisation to be restarted. This provides a mechanism by which the content of the global control register 600 can be trusted in use during operations of the data processing system, even if the processing element that initially setup the global control registers 600 is subsequently used to execute untrusted software.

FIG. 11 schematically illustrates the configuration of a firewall device in a data processing system according to some embodiments. A system interconnect 650 is shown connecting via a firewall device 660 to a memory device 670. Accordingly the firewall device 660 protects the memory device 670 with respect to the accesses communicated by the system interconnect 650. Referring to FIG. 1 any of the firewall devices 24, 26, 28 might be configured in accordance with the example arrangement shown for the firewall device 660. A memory transaction 661 received from the system interconnect 650 by the firewall device 660 comprises a memory address 662 (to be found within the memory device 670) and an owning subsystem identifier 663. In some embodiments the memory address received by the firewall device 660 is derived (by the system interconnect 650) from the memory address previously presented to the system interconnect 650 by a processing element, or SMPU. This derivation may comprise performing address decoding and removing bits from the address that are no longer required. The resulting address received by the firewall may therefore be relative to the base address of the memory device 670, instead of an full physical address. The filtering circuitry 665 of the firewall device 660 makes use of these two data items to determine whether the memory transaction 661 should be allowed to proceed to the memory device 670. The filtering device 665 bases this determination on information stored in the access configuration storage 666. This access configuration storage 666 can thus define ranges of memory addresses which may be accessed by certain owning subsystems (and may not be accessed by others). The access configuration storage may also (alternatively or in addition) store per-subsystem permissions, i.e. simply defining which subsystems may access the memory device 670 (at all). Accordingly the filtering circuitry 665 determines whether access to the memory address 662 is allowed for the owning subsystem 663 and on this basis the filtering circuitry controls the gating 668 which either blocks the memory transaction or allows it to continue to the memory device 670. Notice therefore that the firewall device 660 only needs to filter based on the subsystem identifier and does not need to know about the relationship of peripherals to their owning subsystems. This simplifies the configuration of this component and reduces the number of bits that need to be carried on the system interconnect.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. In some embodiments the simulator may also simulate a system to accompany the simulated processor, wherein the simulated system may include system interconnects, memories, peripherals, and SMPUs or SMMUs that are either not present in the host hardware 730, or do not have all the features required in the simulation environment to run the guest operating system and/or applications 700. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the interface of the hardware architecture being modelled by the simulator program 710. Thus, the program instructions of the target code 700, including those that result in the generation of memory transactions from (simulated) peripheral devices as described above, may be executed from within the instruction execution environment using the simulator program 710, so that a host computer 730 which does not actually have the hardware features of the apparatuses (e.g. SMPUs) discussed above can emulate these features.

In brief overall summary, apparatuses, methods and techniques for controlling memory access in a data processing system are disclosed. The operating data processing system comprises multiple subsystems, each comprising at least one processing element and at least one peripheral device. Memory transaction control circuitry receives memory transaction information of a memory transaction comprising a stream identifier indicative of the issuing peripheral device. A main control register indicates an address of a stream table having multiple entries each comprising an owning subsystem identifier. At least one subsystem control register corresponding to each subsystem of the multiple subsystems stores memory access checking configuration information. On receipt of the memory transaction information an entry of the stream table is selected in dependence on the stream identifier. At least one subsystem control register corresponding to the subsystem identified by the owning subsystem identifier of the entry is selected. Enforcement is then caused of memory access rules in dependence on the memory transaction information and the memory access checking configuration information stored in the selected at least one subsystem control register.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus for controlling memory access in a data processing system, wherein the data processing system when operating comprises multiple subsystems, each subsystem comprising at least one processing element and at least one peripheral device, the apparatus comprising:
   memory transaction control circuitry to receive memory transaction information of a memory transaction issued by a peripheral device of the data processing system, wherein the memory transaction information comprises a stream identifier indicative of the peripheral device;
   a main control register to store a value indicative of an address of a stream table, wherein the stream table comprises multiple entries, and wherein the multiple entries each comprise an owning subsystem identifier; and,
   at least one subsystem control register corresponding to each subsystem of the multiple subsystems, the at least one subsystem control register to store memory access checking configuration information, wherein the memory transaction control circuitry is responsive to reception of the memory transaction information:
      to select an entry of the multiple entries of the stream table identified by the value indicative of the address of the stream table in dependence on the stream identifier;
      to select at least one subsystem control register corresponding to the subsystem identified by the owning subsystem identifier of the entry; and,
      to cause enforcement of memory access rules in dependence on the memory transaction information and the memory access checking configuration information stored in the selected at least one subsystem control register,
   wherein at least one peripheral device of the data processing system is a multi-stream-identifier peripheral associated with more than one stream identifier, wherein the more than one stream identifiers for the multi-stream-identifier peripheral are associated with mutually independent operations of the multi-stream-identifier peripheral.

2. The apparatus as claimed in claim 1, wherein the enforcement of the memory access rules is further in dependence on additional memory access checking configuration information, wherein the additional memory access checking configuration information comprises:
   a context descriptor table, wherein the context descriptor table has multiple context descriptors, each context descriptor comprising a value indicative of the address of a memory region attribute table; and,
   memory region attribute definitions accessed by the memory transaction control circuitry in dependence on the value indicative of the address of a memory region attribute table, wherein the address of the context descriptor table is determined in dependence on one of:
      a further value in the selected entry of the stream table; and,
      a further value in the selected at least one subsystem control register.

3. The apparatus as claimed in claim 2, wherein the memory transaction information further comprises a sub-stream identifier indicative of an originating context in the peripheral device of the memory transaction and wherein accessing the additional memory access checking configuration information in dependence of the value indicative of the address of a context descriptor table comprises:

selecting a context descriptor from the context descriptor table identified by the value indicative of the address of a context descriptor table, in dependence on the substream identifier;

retrieving the value indicative of the address of a memory region attribute table from the selected context descriptor; and, accessing a memory region attribute table identified by the value indicative of the address of the memory region attribute table to retrieve at least one of the memory region attribute definitions.

4. The apparatus as claimed in claim 3, wherein the context descriptor selected in the context descriptor table also stores a value indicative of the memory region attribute table size and accessing the memory region attribute table comprises accessing an area of memory defined by the value indicative of the address of a memory region attribute table and the value indicative of the memory region attribute table size.

5. The apparatus as claimed in claim 4, wherein the at least one memory region attribute definition retrieved includes additional memory access rule information comprising permissions information and the at least one memory region attribute definition retrieved further comprises values indicative of the start and end addresses of the memory region.

6. The apparatus as claimed in claim 3, wherein the memory region attribute table identified by the value indicative of the address of a memory region attribute table forms part of a page table hierarchy and the additional memory access rule information comprises permission information defined in the page table hierarchy.

7. The apparatus as claimed in claim 3, wherein the memory transaction control circuitry is further responsive to a substream identifier validity marker in the memory transaction information, when the substream identifier validity marker indicates an invalidity of the substream identifier, to perform the selection of the entry in the context descriptor table in dependence on a predetermined substream identifier.

8. The apparatus as claimed in claim 1, further comprising a memory transaction transmission interface to issue an outgoing memory transaction targeting a data storage device of the data processing system, wherein the outgoing memory transaction comprises an assigned owning subsystem identifier.

9. The apparatus as claimed in claim 8, wherein the memory transaction control circuitry is further responsive to reception of the memory transaction information:
to cause a first outgoing memory transaction to be issued by the memory transaction transmission interface to access the stream table, wherein a first assigned owning subsystem identifier in the first outgoing memory transaction is one of:
a predetermined value indicative of a valid subsystem; and,
a value indicating that the first outgoing memory transaction does not have an associated owning subsystem identifier.

10. The apparatus as claimed in claim 8, wherein the memory transaction control circuitry is further responsive to reception of the memory transaction information:
to cause a second outgoing memory transaction to be issued by the memory transaction transmission interface to access the memory access checking configuration information in dependence on the address of the context descriptor table, wherein a second assigned owning subsystem identifier in the second outgoing memory transaction is determined in dependence on the owning subsystem identifier of the selected entry of the stream table.

11. The apparatus as claimed in claim 8, wherein the memory transaction control circuitry is further responsive to reception of the memory transaction information, when the apparatus is set to be in an inactive mode, to cause all outgoing memory transactions issued by the memory transaction transmission interface to have one of:
the predetermined value indicative of a valid subsystem as the assigned owning subsystem identifier; and,
a value indicating that the transaction does not have an associated owning subsystem identifier.

12. The apparatus as claimed in claim 8, wherein the memory transaction control circuitry is further responsive to reception of the memory transaction information to cause at least one outgoing memory transaction issued by the memory transaction transmission interface in association with the received memory transaction information to be configured in accordance with at least one of:
further configuration parameters in the main control register; and
further configuration parameters in the selected entry of the stream table.

13. The apparatus as claimed in claim 1, wherein the memory transaction control circuitry is further responsive to reception of a register write transaction, when the register write transaction specifies a write to at least one address within a target subsystem control register, to cause all operations initiated as a result of the write to the at least one address within the target subsystem control register to be restricted by the owning subsystem identifier associated with the target subsystem control register.

14. The apparatus as claimed in claim 13, wherein an operation initiated as a result of the write to the at least one address within the target subsystem control register is a cache invalidation operation, and wherein the apparatus further comprises a cache, and the cache invalidation operation is restricted to cache content associated with the owning subsystem identifier.

15. The apparatus as claimed in claim 1, wherein the mutually independent operations of the multi-stream-identifier peripheral are each associated with different subsystems of the multiple subsystems of the data processing system.

16. The apparatus as claimed in claim 1, wherein the main control register further comprises lockdown bit storage to store a lockdown bit, wherein modification of the content of the main control register is not permitted when the lockdown bit has a predetermined lockdown bit value.

17. The apparatus as claimed in claim 1, further comprising memory transaction filtering circuitry responsive to reception of the memory transaction to determine from the memory transaction information and the memory access checking configuration information whether the memory transaction is permitted, and when the memory transaction is permitted the memory transaction filtering circuitry is arranged to modify the memory transaction to include the owning subsystem identifier.

18. A data processing system comprising the apparatus as claimed in claim 17, further comprising:
a further filtering device to receive the memory transaction after the apparatus has modified the memory transaction, wherein the further filtering device comprises:
a memory transaction reception interface to receive the memory transaction, wherein the memory transaction specifies a value indicative of at least a portion of a memory address, and the owning subsystem identifier value indicative of an owning subsystem; access configuration storage; and, further memory transaction filtering circuitry responsive to reception of the memory transaction by the memory transaction reception interface:

to forward the memory transaction to a target memory device when content of the access configuration storage indicates that memory transactions having the owning subsystem identifier value indicative of the owning subsystem are permitted to access a memory location associated with the value indicative of at least a portion of a memory address; and, to block the memory transaction to the target memory device when the content of the access configuration storage does not indicate that memory transactions having the owning subsystem identifier value indicative of the owning subsystem are permitted to access the memory location associated with the value indicative of at least a portion of a memory address.

19. The apparatus as claimed in claim 18, wherein the content of the access configuration storage comprises an access permission for each owning subsystem for the target memory device.

20. The apparatus as claimed in claim 18, wherein the content of the access configuration storage comprises access permissions for memory regions within the target memory device for each owning subsystem.

21. A method of controlling memory access in a data processing system, wherein the data processing system when operating comprises multiple subsystems, each subsystem comprising at least one processing element and at least one peripheral device, the method comprising:

receiving memory transaction information of a memory transaction issued by a peripheral device of the data processing system, wherein the memory transaction information comprises a stream identifier indicative of the peripheral device;

storing a value indicative of an address of a stream table in a main control register, wherein the stream table comprises multiple entries, and wherein the multiple entries each comprise an owning subsystem identifier;

storing memory access checking configuration information in at least one subsystem control register corresponding to each subsystem of the multiple subsystems; and, in response reception of the memory transaction information:

selecting an entry of the multiple entries of the stream table identified by the value indicative of the address of the stream table in dependence on the stream identifier;

selecting at least one subsystem control register corresponding to the subsystem identified by the owning subsystem identifier of the entry; and, causing enforcement of memory access rules in dependence on the memory transaction information and the memory access checking configuration information stored in the selected at least one subsystem control register, wherein at least one peripheral device of the data processing system is a multi-stream-identifier peripheral associated with more than one stream identifier, wherein the more than one stream identifiers for the multi-stream-identifier peripheral are associated with mutually independent operations of the multi-stream-identifier peripheral.

22. Apparatus for controlling memory access in a data processing system, wherein the data processing system when operating comprises multiple subsystems, each subsystem comprising at least one processing element and at least one peripheral device, the apparatus comprising:

means for receiving memory transaction information of a memory transaction issued by a peripheral device of the data processing system, wherein the memory transaction information comprises a stream identifier indicative of the peripheral device;

means for storing a value indicative of an address of a stream table in a main control register, wherein the stream table comprises multiple entries, and wherein the multiple entries each comprise an owning subsystem identifier;

means for storing memory access checking configuration information in at least one subsystem control register corresponding to each subsystem of the multiple subsystems;

means for selecting an entry of the multiple entries of the stream table identified by the value indicative of the address of the stream table in dependence on the stream identifier in response to reception of the memory transaction information;

means for selecting at least one subsystem control register corresponding to the subsystem identified by the owning subsystem identifier of the entry; and, means for causing enforcement memory access rules in dependence on the incoming memory transaction information and the memory access checking configuration information stored in the selected at least one subsystem control register, wherein at least one peripheral device of the data processing system is a multi-stream-identifier peripheral associated with more than one stream identifier, wherein the more than one stream identifiers for the multi-stream-identifier peripheral are associated with mutually independent operations of the multi-stream-identifier peripheral.

23. A non-transitory, computer-readable storage medium storing a computer program, which when executed by processing circuitry, controls a host data processing apparatus to provide an instruction execution environment comprising:

memory access control logic for controlling memory access in a data processing system, wherein the data processing system when operating comprises multiple subsystems, each subsystem comprising at least one instance of processing element logic and at least one instance of peripheral device logic, the memory access control logic comprising:

memory transaction checking logic to receive memory transaction information of a memory transaction issued by an instance of peripheral device logic of the data processing system, wherein the memory transaction information comprises a stream identifier indicative of the instance of peripheral device logic;

main control register logic to store a value indicative of an address of a stream table, wherein the stream table comprises multiple entries, and wherein the multiple entries each comprise an owning subsystem identifier; and, at least one instance of subsystem control register logic corresponding to each subsystem of the multiple subsystems, the at least one instance of subsystem control register logic to store memory access checking configuration information, wherein the memory transaction checking logic is responsive to reception of the memory transaction information:
to select an entry of the multiple entries of the stream table identified by the value indicative of the address of the stream table in dependence on the stream identifier;
to select at least one instance of subsystem control register logic corresponding to the subsystem identified by the owning subsystem identifier of the entry; and,
to cause enforcement of memory access rules in dependence on the memory transaction information and the memory access checking configuration information stored in the selected at least one instance of subsystem control register logic,
wherein at least one instance of peripheral device logic of the data processing system is a multi-stream-identifier peripheral device logic associated with more than one stream identifier, wherein the more than one stream identifiers for the multi-stream-identifier peripheral device logic are associated with mutually independent operations of the multi-stream-identifier peripheral device logic.

* * * * *